(12) United States Patent
Fan et al.

(10) Patent No.: US 10,601,966 B2
(45) Date of Patent: Mar. 24, 2020

(54) MOBILE TERMINAL

(71) Applicant: GUANGDONG OPPO MOBILE TELECOMMUNICATIONS CORP., LTD., Dongguan, Guangdong (CN)

(72) Inventors: Xiaoyu Fan, Guangdong (CN); Zhengshan Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/202,477

(22) Filed: Nov. 28, 2018

(65) Prior Publication Data

US 2019/0253533 A1 Aug. 15, 2019

(30) Foreign Application Priority Data

Feb. 9, 2018 (CN) ...................... 2018 2 0235056 U

(51) Int. Cl.
*H04M 1/02* (2006.01)
*G06F 1/16* (2006.01)
*H04M 1/03* (2006.01)

(52) U.S. Cl.
CPC ........ *H04M 1/0206* (2013.01); *G06F 1/1686* (2013.01); *H04M 1/0264* (2013.01); *G06F 1/1624* (2013.01); *H04M 1/0237* (2013.01); *H04M 1/03* (2013.01)

(58) Field of Classification Search
CPC .. H04M 1/026; H04M 1/0264; H04M 1/0266; H04M 1/0277
See application file for complete search history.

(56) References Cited

U.S. PATENT DOCUMENTS

| 2006/0088310 A1 | 4/2006 | Jung |
| 2006/0121959 A1 | 6/2006 | Cha et al. |
| 2017/0230073 A1 | 8/2017 | Youn et al. |
| 2017/0251131 A1 | 8/2017 | Wu et al. |

(Continued)

FOREIGN PATENT DOCUMENTS

| CN | 106790833 A | 5/2017 |
| CN | 206251153 U | 6/2017 |
| CN | 107454216 A | 12/2017 |

(Continued)

OTHER PUBLICATIONS

International search report and Written Opinion dated Feb. 27, 2019; PCT/CN2016/117706.
European search report, EP18209186.8, dated May 7, 2019.

*Primary Examiner* — Sam Bhattacharya

(57) ABSTRACT

The present disclosure provides a mobile terminal including a middle frame, a main board, a display screen module, and a back plate. The middle frame includes a front side face, a back side face, a left side face, a right side face, and a top face. The display screen module is disposed on the front side face. The back plate is disposed on the back side face. A receiving groove is defined by the top face of the middle frame, the display screen module and the back plate. The mobile terminal further includes a mounting box slideably received in the receiving groove. A first camera is disposed at a side face of the mounting box that faces the display screen module. The mounting box is extended out of or retracted into the receiving groove so that the first camera is exposed out of or hidden into the receiving groove.

20 Claims, 19 Drawing Sheets

(56) References Cited

U.S. PATENT DOCUMENTS

2017/0318201 A1 11/2017 Evans, V et al.
2018/0262663 A1 9/2018 Zhang

FOREIGN PATENT DOCUMENTS

| CN | 207926663 U | 9/2018 |
|----|-------------|--------|
| CN | 207926664 U | 9/2018 |
| EP | 3396933 A1 | 10/2018 |

MOBILE TERMINAL

CROSS-REFERENCE TO RELATED APPLICATION

This application claims priority to Chinese Patent Application No. 201820235056.9, filed on Feb. 9, 2018, the contents of which are herein incorporated by reference in its entirety.

TECHNICAL FIELD

The present disclosure relates to the technical field of mobile terminals.

BACKGROUND

Mobile terminals currently available, such as mobile phones, tablet computers or the like, are usually provided with electronic devices, such as front-facing lens components, earpiece components, light sensors or the like, on front faces thereof. In pursuit of better visual experiences, full-screen mobile phones have become the new development tendency of mobile phones. However, electronic devices, such as the front-facing lens components, the earpiece components, the light sensors or the like, disposed on the front faces of the full-screen mobile phones currently available will occupy spaces on the front faces of the mobile terminals. Therefore, the increase in a screen-to-body ratio of mobile phone may be limited.

SUMMARY

A mobile terminal includes a middle frame, a main board disposed in the middle frame, a display screen module connected to the main board, and a back plate. The middle frame includes a front side face, a back side face facing away from the front side face, a left side face and a right side face disposed opposite to each other, and a top face. The display screen module is disposed on the front side face of the middle frame. The back plate is disposed on the back side face of the middle frame. A receiving groove is defined on the top of the middle frame. The receiving groove is defined by the top face of the middle frame, the display screen module, and the back plate. The receiving groove extends in a left-right direction. Two opposite ends of the receiving groove extend to the left side face and the right side face of the middle frame respectively. The mobile terminal further includes a mounting box slideably received in the receiving groove. A first camera connected to the main board is disposed at a side face of the mounting box that faces the display screen module. The mounting box is configured to extend out of or retract into the receiving groove so that the first camera is exposed out of or hidden into the receiving groove.

BRIEF DESCRIPTION OF THE DRAWINGS

In order to more clearly illustrate the technical solutions in the embodiments of the present disclosure, a brief introduction will be made below to the drawings required to be used in the embodiments. Evidently, the drawings in the following description are only some embodiments of the present disclosure. A person of ordinary skilled in the art can further obtain other drawings without any creative work according to these drawings.

DETAILED DESCRIPTION

Figure 1:
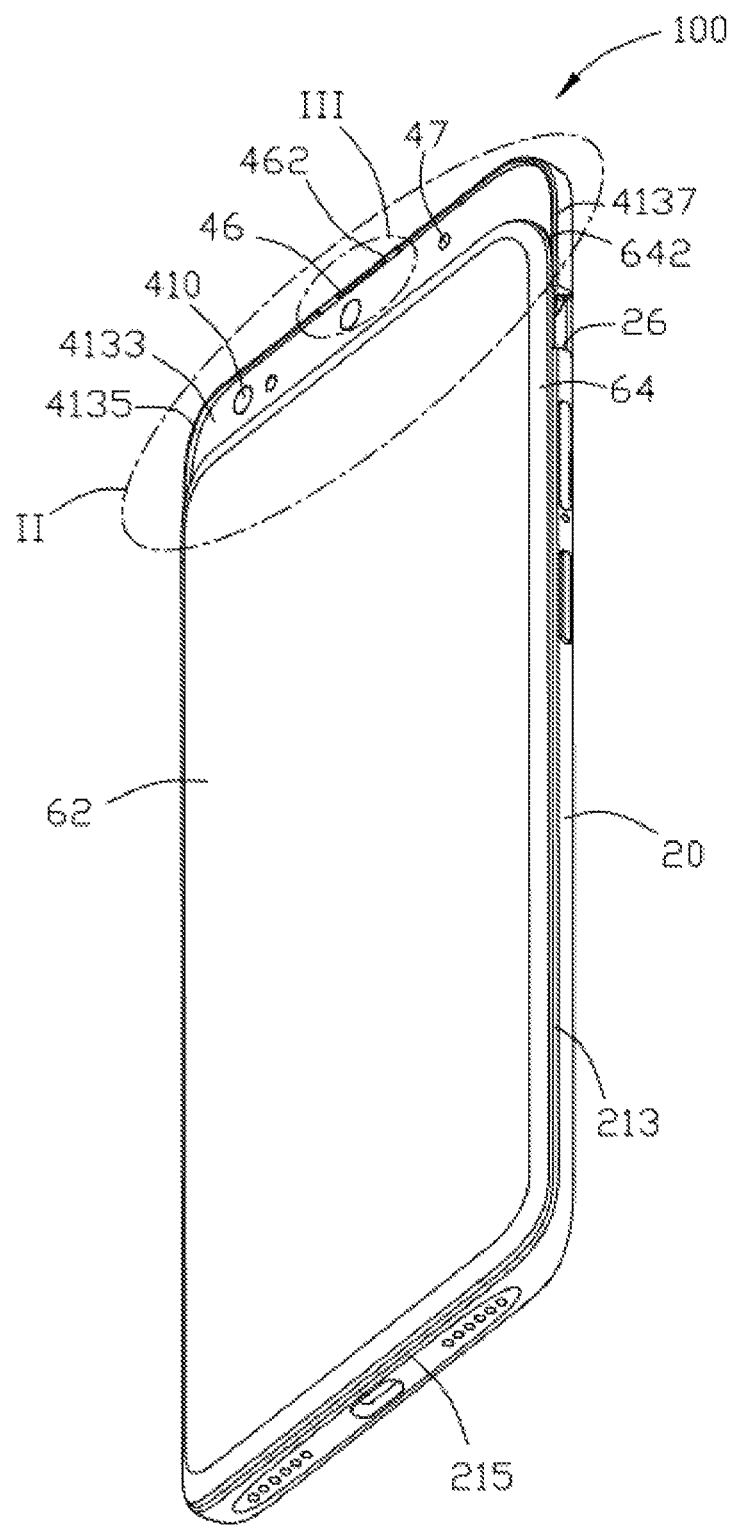
FIG. 1 is a schematic perspective structural view of a mobile terminal according to a first embodiment of the present disclosure.
Figure 2:
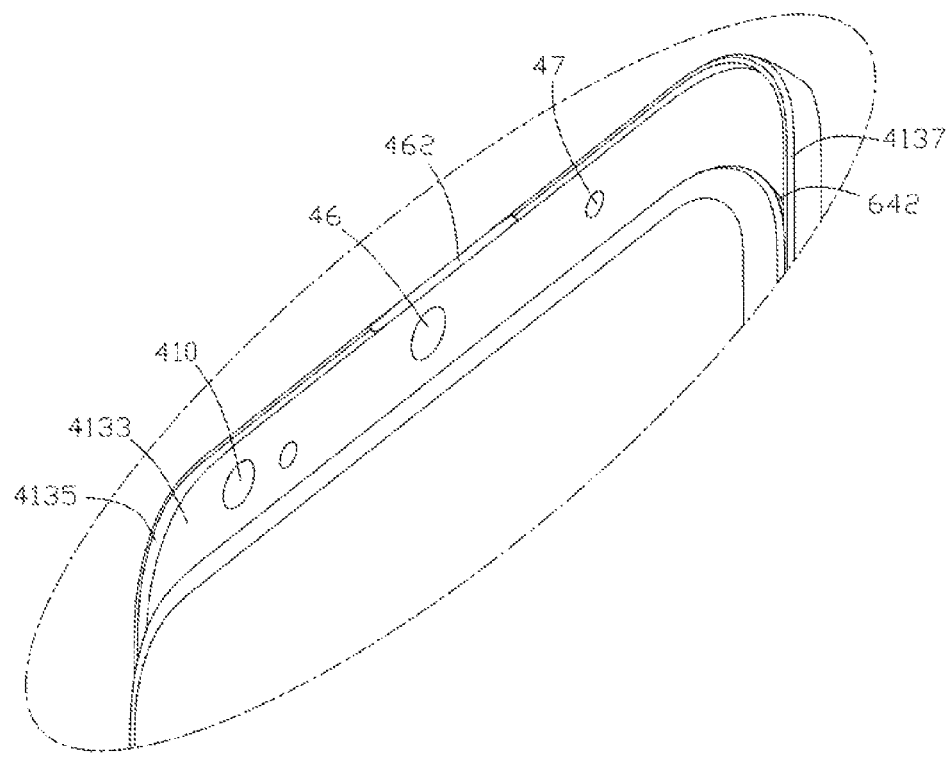
FIG. 2 is an enlarged view of part II in FIG. 1.
Figure 3:
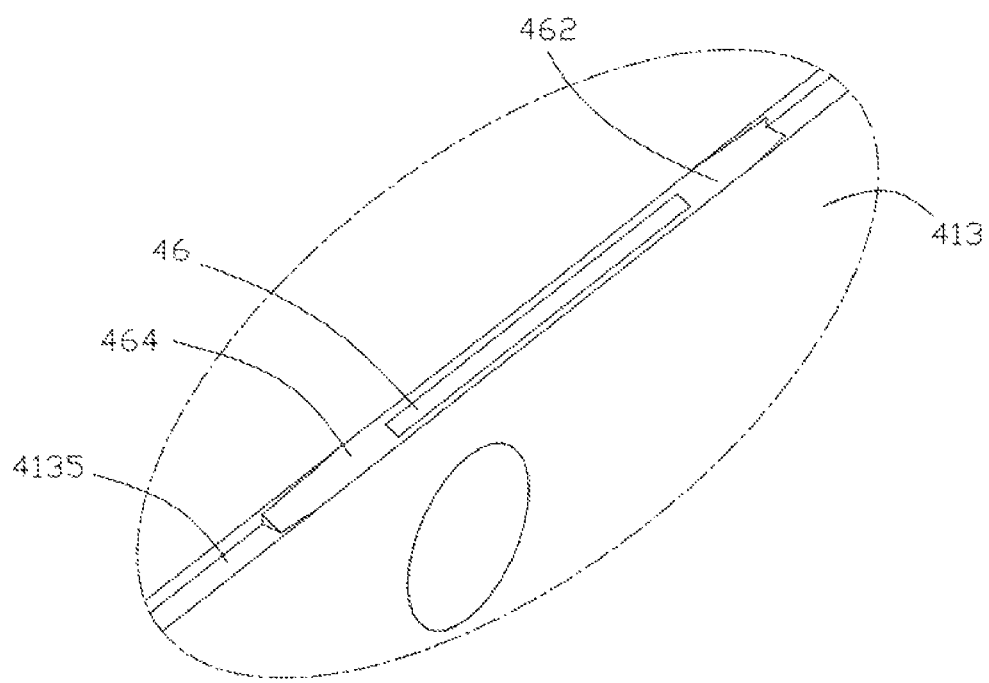
FIG. 3 is an enlarged view of part III in FIG. 1.
Figure 4:
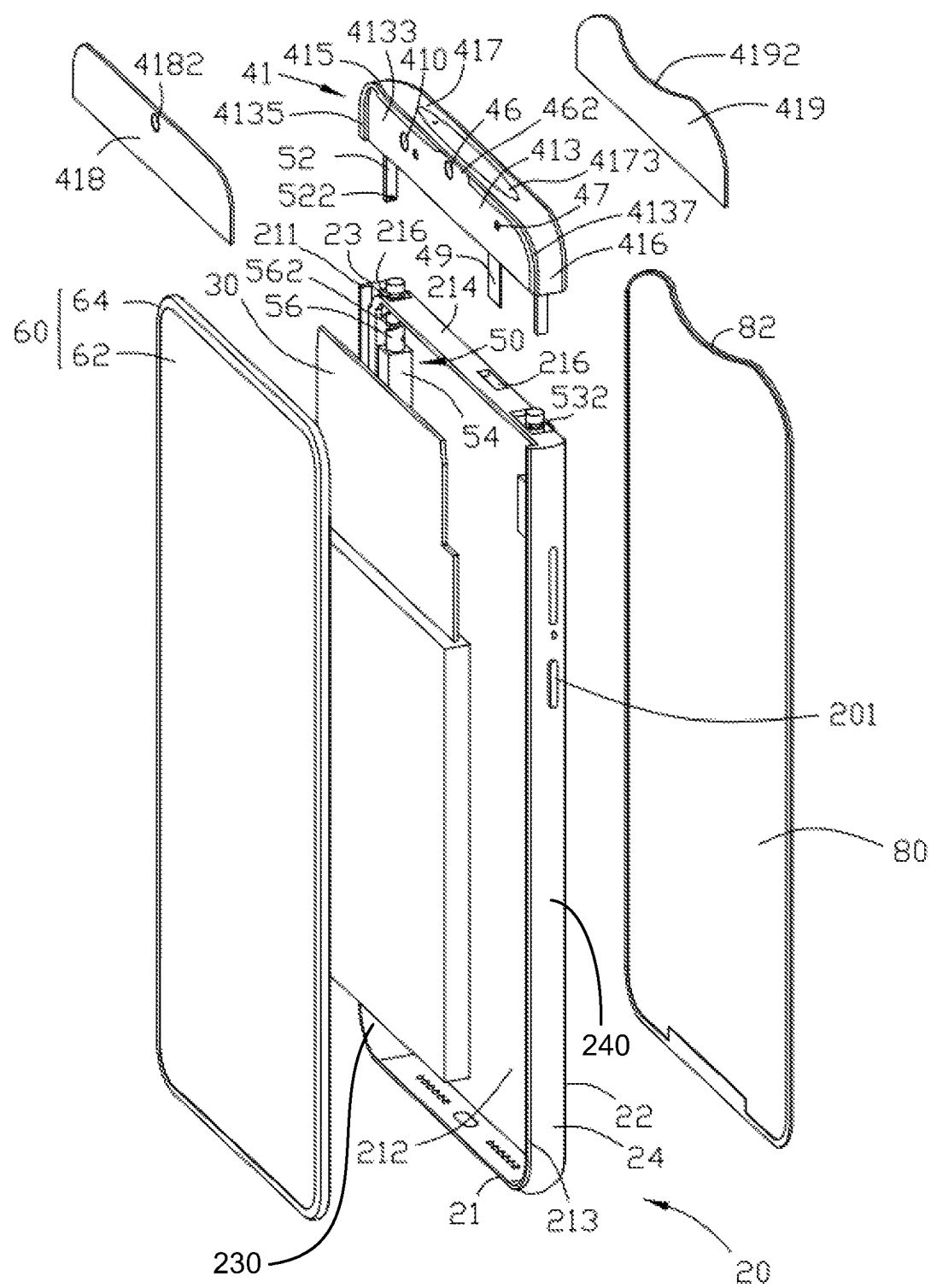
FIG. 4 is a schematic perspective exploded view of the mobile terminal according to the first embodiment of the present disclosure.
Figure 5:
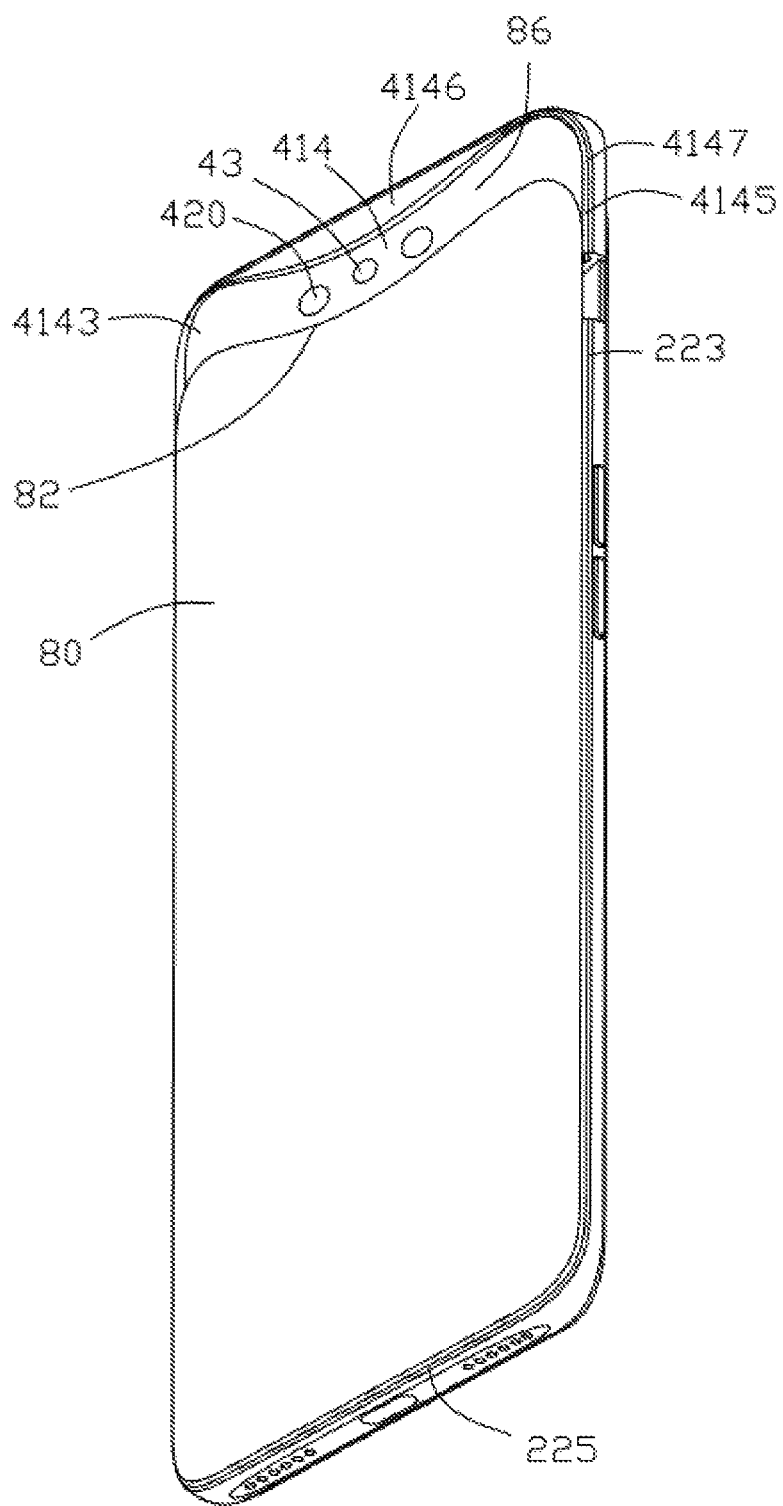
FIG. 5 is a schematic perspective view of FIG. 1 at another angle of view.
Figure 6:
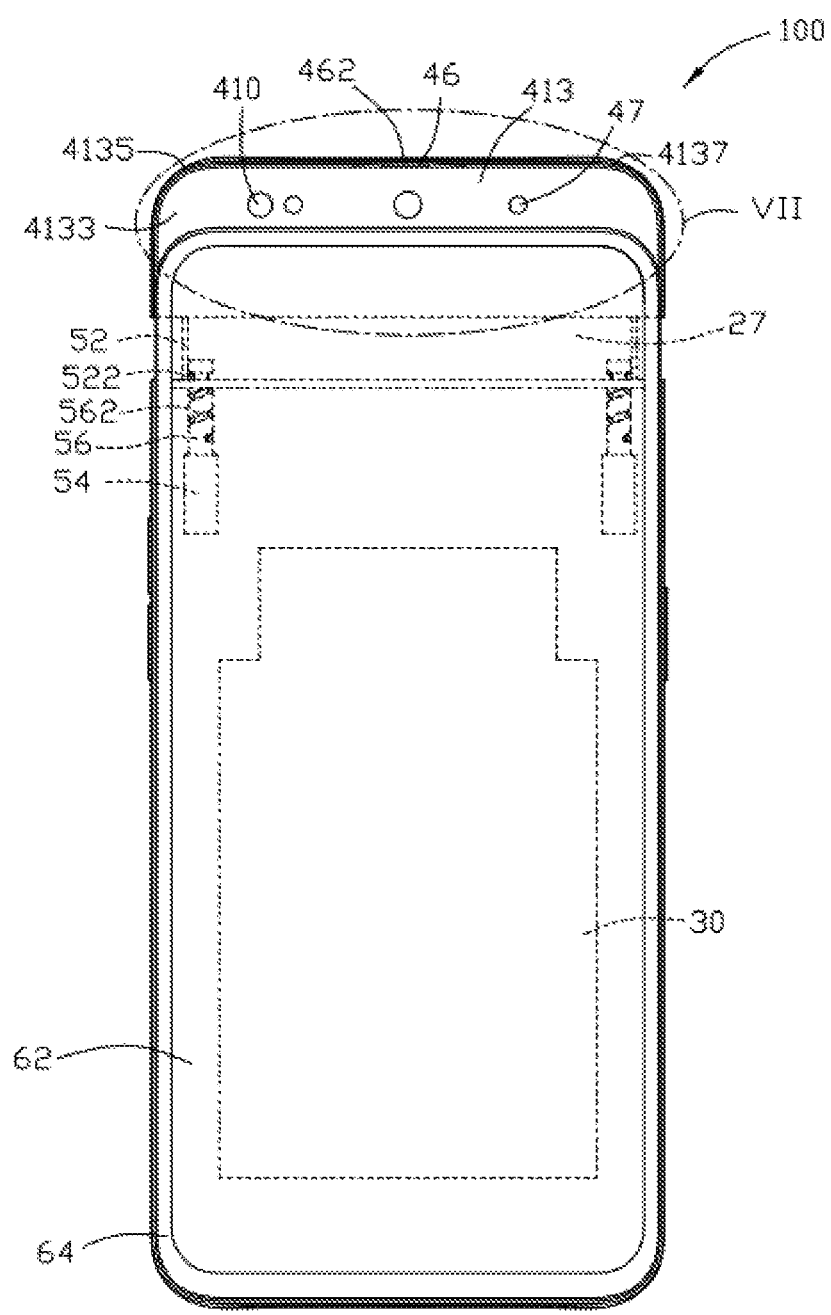
FIG. 6 is a schematic view of a front side face of the mobile terminal according to the first embodiment of the present disclosure.
Figure 7:
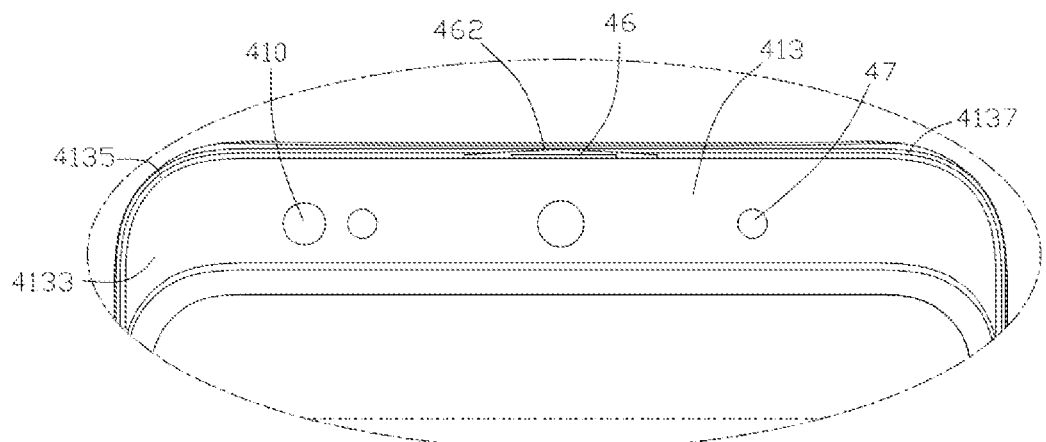
FIG. 7 is an enlarged view of part VII in FIG. 6.
Figure 8:
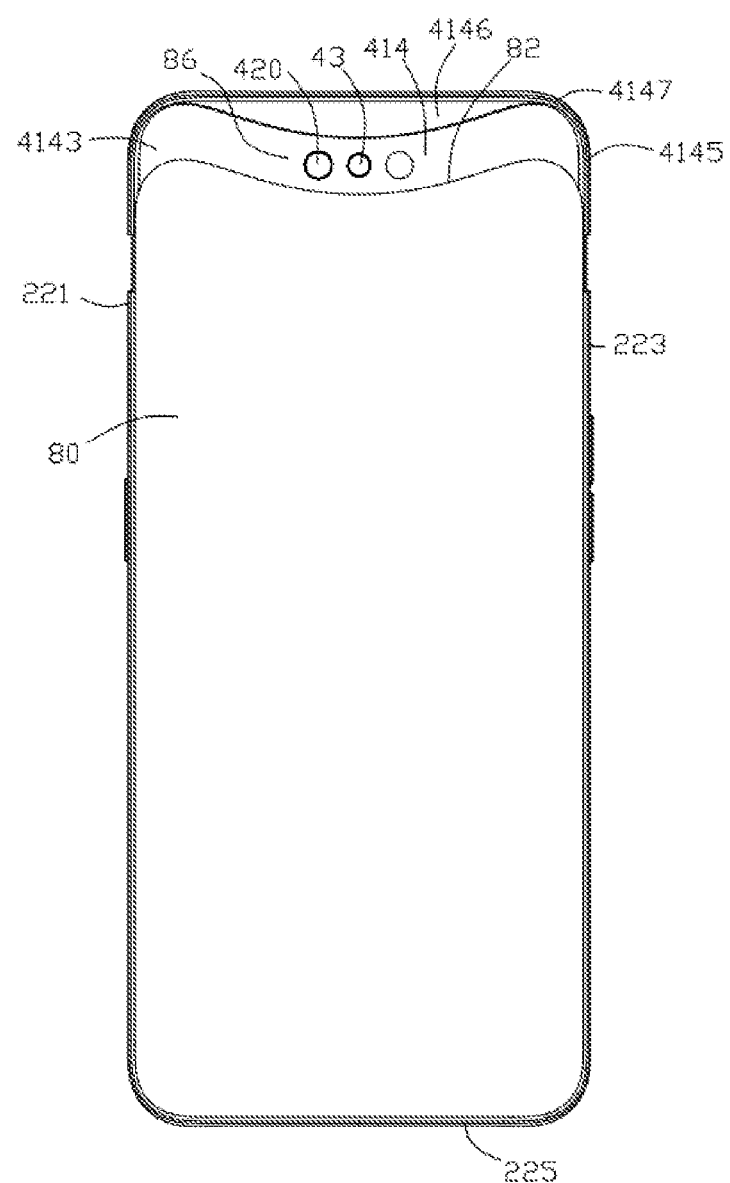
FIG. 8 is a schematic view of a back side face of the mobile terminal according to the first embodiment of the present disclosure.
Figure 9:
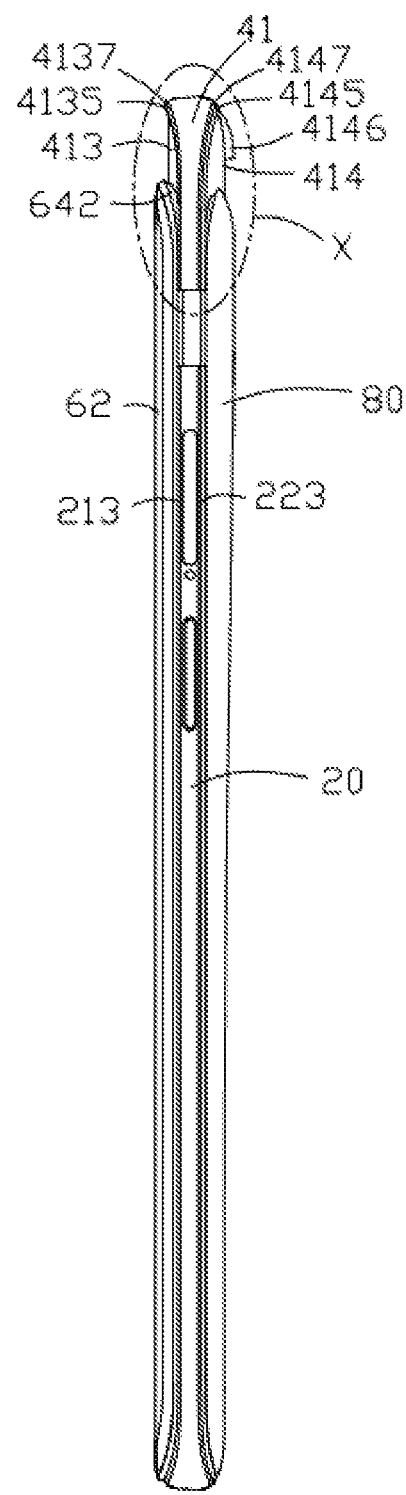
FIG. 9 is a schematic view of a side face of the mobile terminal according to the first embodiment of the present disclosure.
Figure 10:
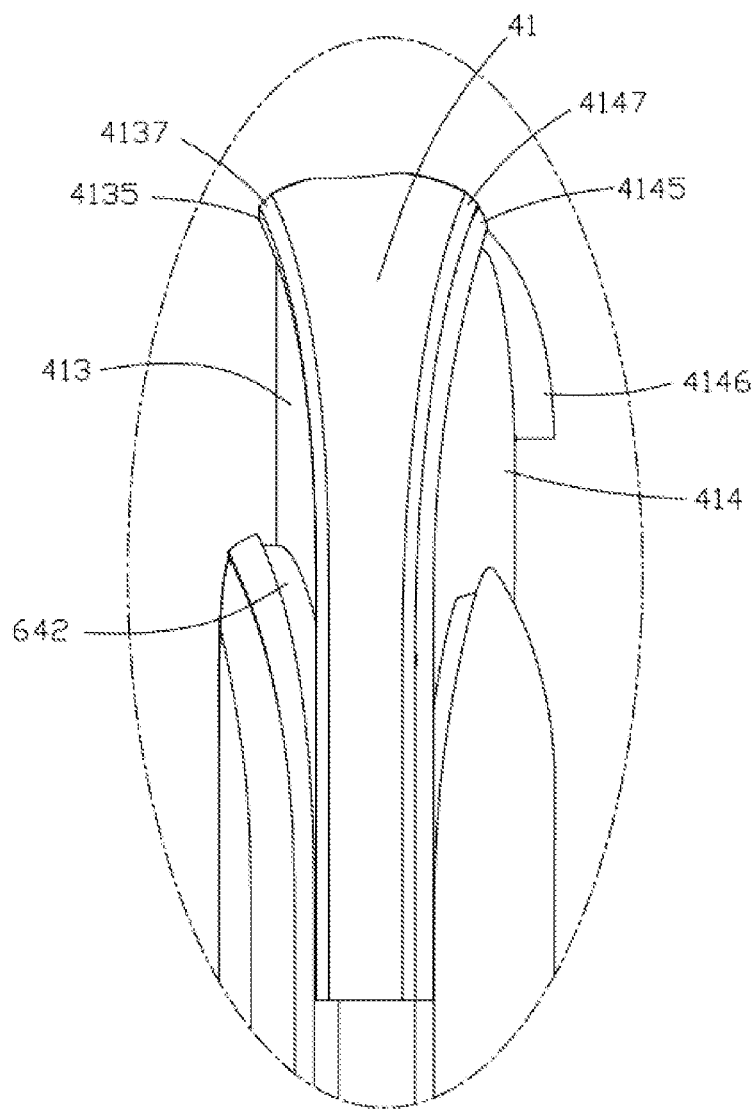
FIG. 10 is an enlarged view of part X in FIG. 9.
Figure 11:
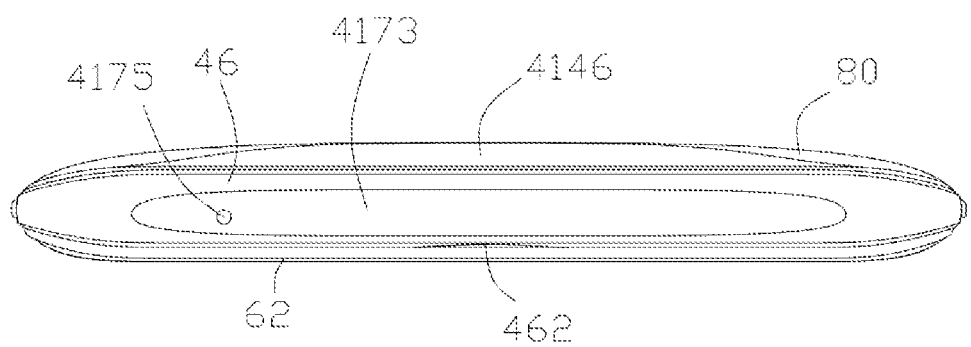
FIG. 11 is a schematic view of a top face of the mobile terminal according to the first embodiment of the present disclosure.
Figure 12:
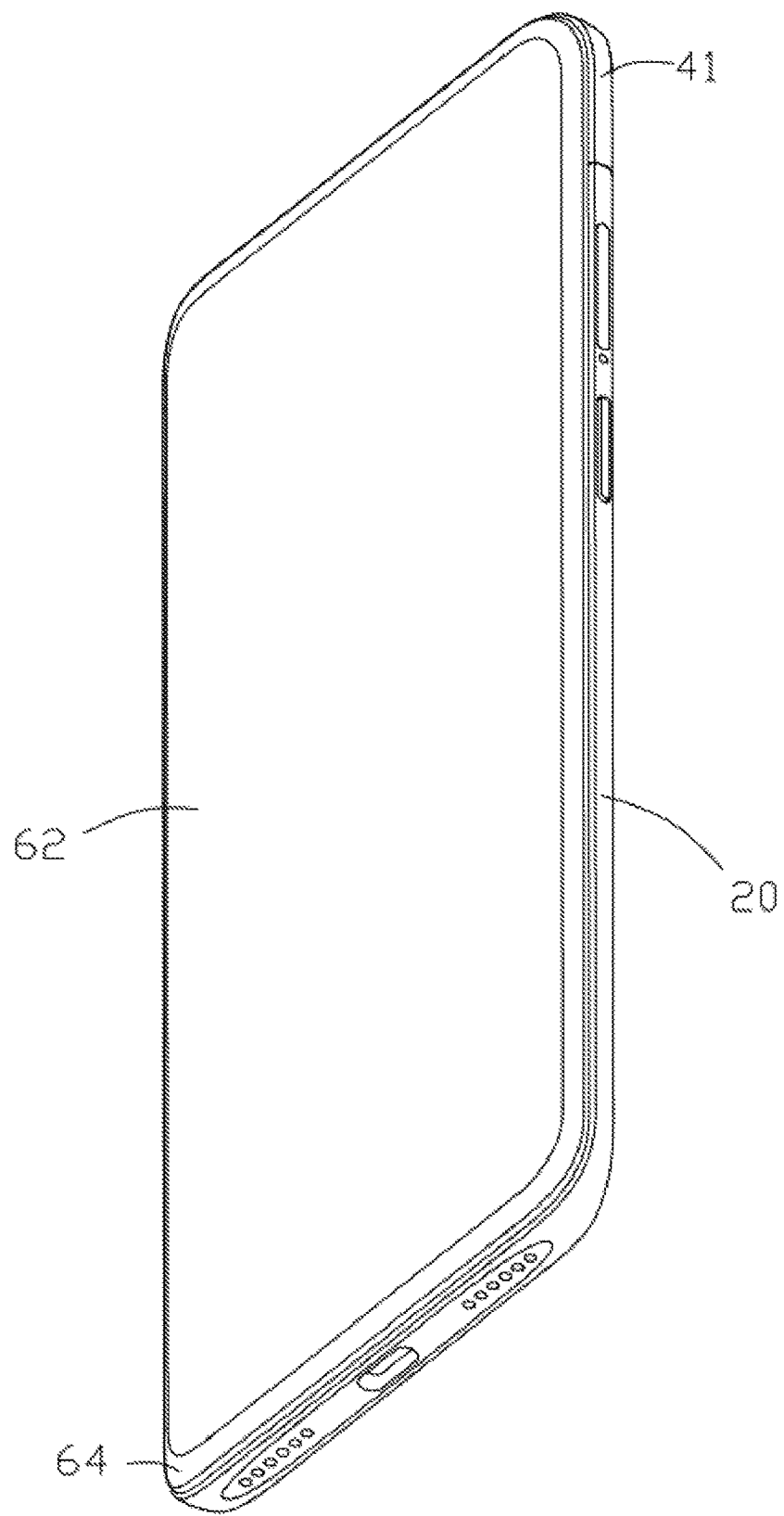
FIG. 12 is a schematic view of a usage state of the mobile terminal according to the first embodiment of the present disclosure.
Figure 13:
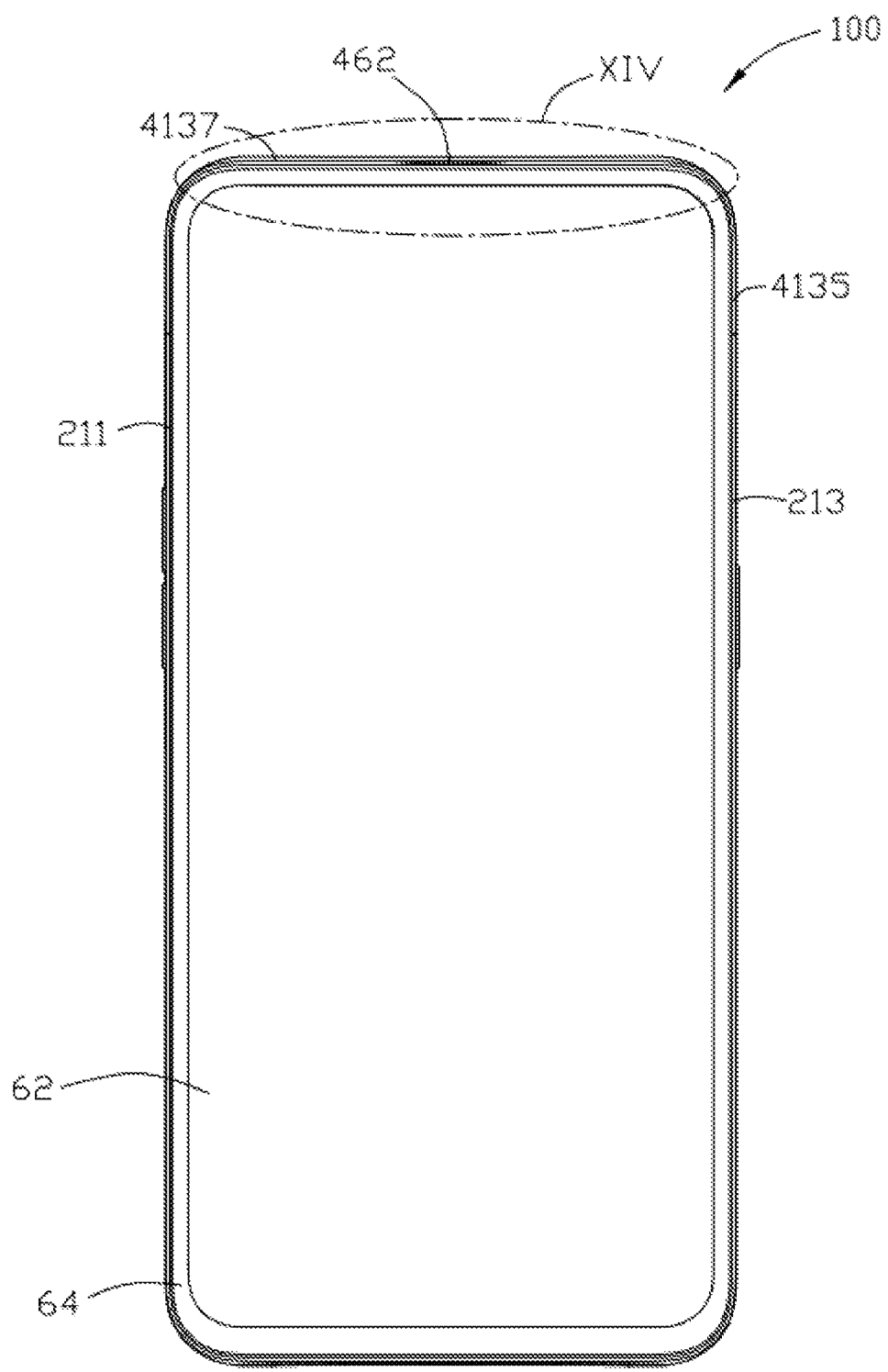
FIG. 13 is a schematic view of a front side face of FIG. 12.
Figure 14:
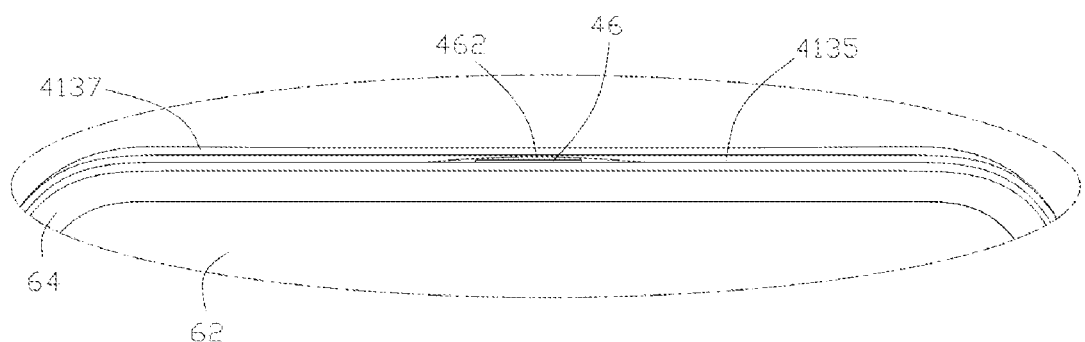
FIG. 14 is an enlarged view of part XIV in FIG. 13.
Figure 15:
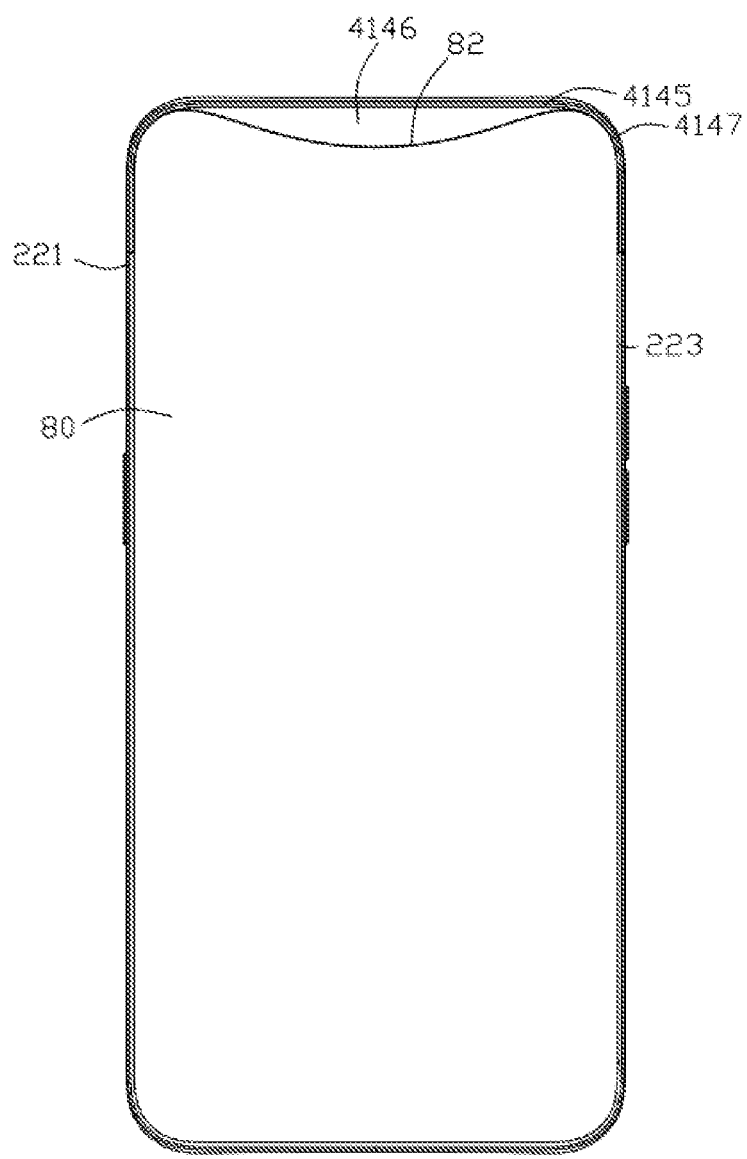
FIG. 15 is a schematic view of a back side face of FIG. 12.
Figure 16:
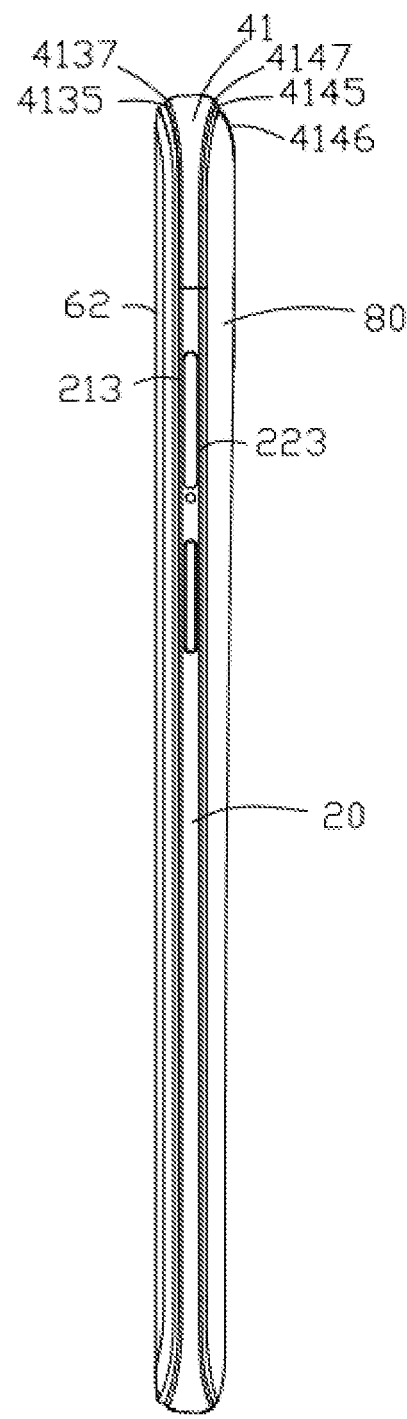
FIG. 16 is a schematic view of a side face of FIG. 12.

A clear and complete description of the technical solutions in the embodiments of the present disclosure will be given below in conjunction with the accompanying drawings in the embodiments of the present disclosure. Apparently, the embodiments described below are merely a part of the embodiments of the present disclosure, rather than all of the embodiments. All other embodiments obtained by a person of ordinary skill in the art without creative efforts on the basis of the embodiments of the present disclosure shall fall within the protection scope of the present disclosure.

In the description of the embodiments of the present disclosure, it should be understood that, orientation or position relations denoted by the terms "upper", "lower", "left", "right" and the like, which are orientation or position relations shown on the basis of the accompanying drawings, are merely intended to facilitate describing the present disclosure in a concise manner, rather than suggest or show that the devices or elements referred to must have particular orientation and must be constructed and operated with particular orientation. Thus, the above terms shall not be construed as limiting the present disclosure.

In the present disclosure, unless specified or limited otherwise, terms "mounted", "connected", "coupled", "disposed above" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

Further, in the description of the present disclosure, the term "a plurality of" means two or more unless otherwise specified. If the term "process" appears in this specification, it means not only an independent process, but also when it is not clearly distinguishable from other processes, it is included in the term as long as the intended function of the process can be realized. In addition, the numerical range represented by "-" in this specification is a range in which the numerical values described before and after "-" are respectively included as a minimum value and a maximum value. In the drawings, structures that are similar or identical are denoted by the same reference numerals.

In the present application, a communication terminal configured to communicate through a wireless interface may be referred to as a "wireless communication terminal", "wireless terminal", or "mobile terminal". It should be understood that, the "communication terminal" (also referred to as "terminal") used herein includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN), a digital television network such as a DVB-H network, a satellite network, an AM-FM broadcast transmitter, and/or another communication terminal. A communication terminal that is set to communicate over a wireless interface may be referred to as a "wireless communication terminal", "wireless terminal" and/or "mobile terminal". Examples of the mobile terminal include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Referring to FIG. 1 to FIG. 11 together, the present disclosure provides a mobile terminal 100 which comprises a middle frame 20, a main board 30 disposed in the middle frame 20, a display screen module 60 connected to the main board 30, and a back plate 80. The middle frame 20 comprises a front side face 21, a back side face 22 facing away from the front side face 21, a left side face 23 and a right side face 24 disposed opposite to each other, and a top face 26. The display screen module 60 is disposed on the front side face 21 of the middle frame 20, and the back plate 80 is disposed on the back side face 22 of the middle frame 20. A receiving groove or storage space 27 is defined on the top of the middle frame 20. The receiving groove 27 is defined by the top face 26 of the middle frame 20, the display screen module 60 and the back plate 80, the receiving groove 27 extends in the left-right direction, and two opposite ends of the receiving groove 27 extend to the left side face 23 and the right side face 24 of the middle frame 20 respectively. The mobile terminal 100 further comprises a mounting box 41 slideably received in the receiving groove 27. A first camera 410 connected to the main board 30 is disposed at a side face of the mounting box 41 that faces the display screen module 60, and the mounting box 41 is extended out of or retracted into the receiving groove 27 so that the first camera 410 is exposed out of or hidden into the receiving groove 27.

The mobile terminal 100 further comprises a driving device 50, and the driving device 50 can drive the mounting box 41 to extend out of or retract into the receiving groove 27 so that the first camera 410 is exposed out of or hidden into the receiving groove 27. When the mounting box 41 is extended out of the receiving groove 27 so that the first camera 410 is exposed to the outside, the light-collecting face of the lens of the first camera 410 will not be blocked by other components of the mobile terminal 100. In this embodiment, the mobile terminal 100 is a mobile phone.

In this embodiment, there are electrical connection and signal connection between the display screen module 60, the first camera 410 and the main board 30. In the present disclosure, the front side face of the middle frame 20 is a face facing the display screen module 60, and the back side face of the middle frame 20 is a face facing away from the display screen module 60.

The top face 26 of the middle frame 20, the display screen module 60 and the back plate 80 of the mobile terminal 100 of the present disclosure together form the receiving groove 27, and the receiving groove 27 extends to the left side face 23 and the right side face 24 of the middle frame in the left-right direction. The driving device 50 can drive the mounting box 41 to extend out of or retract into the receiving groove 27 so that the first camera 410 on the mounting box 41 is exposed out of or hidden into the receiving groove 27. That is, when the first camera 410 needs to be used, the driving device 50 drives the mounting box 41 to extend out of the receiving groove 27 for convenient use by a user. When the first camera 410 does not need to be used, the driving device 50 drives the mounting box 41 to retract into the receiving groove 27. Since the first camera 410 is disposed on the mounting box 41 and the mounting box 41 can be received in the receiving groove 27, the first camera 410 will not occupy the area of the display screen module 60 of the mobile terminal 100 so that the screen-to-body ratio of the mobile terminal 100 can be improved to be above 85% or even up to 95% or more, thereby improving the visual experience. Additionally, the first camera 410 of the mobile terminal 100 can be used only after the mounting box 41 is extended out of the receiving groove 27, so the first camera 410 of the mobile terminal 100 can be prevented from being opened remotely by malicious people for image collection and thus accidental privacy disclosure of users can be prevented, thereby improving the security of the mobile terminal 100.

An accommodating space or chamber 212 is defined in the middle part of the middle frame 20 for accommodating electronic devices such as the main board 30, the driving device 50, batteries or the like. In other words, the middle frame 20 comprises a pair of spaced and parallel side walls 230, 240 engaged with the display screen module 60 and the back plate 80 to define the accommodating space 212. The middle frame 20 is provided with a connection plate 214 which is located between the accommodating space 212 and the receiving groove 27, i.e., the connection plate 214 is the bottom plate of the receiving groove 27, and the top face of the connection plate 214 is just the top face 26 of the middle frame 20. The connection plate 214 is a top of the middle frame 20 and is connected with the side walls 230, 240. Several through holes 216 communicated with the accommodating space 212 are defined on the connection plate 214. A chamfer 211 is disposed at the intersection between the front side face 21 and the left side face 23 of the middle frame 20, a chamfer 213 is disposed at the intersection between the front side face 21 and the right side face 24 of the middle frame 20, and a chamfer 215 is disposed at the intersection between the front side face 21 and the bottom face of the middle frame 20, i.e., chamfers are disposed at all of the left and right sides and the bottom side of the front side face 21 of the middle frame 20. These chamfers 211, 213 and 215 are connected end to end, and the faces of the chamfers 211, 213 and 215 are disposed as highly glossy faces, i.e., the faces of the chamfers 211, 213 and 215 have the effect of reflective mirrors. A chamfer 221 is disposed at the intersection between the back side face 22 and the left side face 23 of the middle frame 20, a chamfer 223 is disposed at the intersection between the back side face 22 and the right side face 24 of the middle frame 20, and a chamfer 225 is disposed at the intersection between the back side face 22 and the bottom face of the middle frame 20, i.e., chamfers are disposed at all of the left and right sides and the bottom side of the back side face 22 of the middle frame 20. These chamfers 221, 223 and 225 are connected end to end, and the faces of the chamfers 221, 223 and 225 are disposed as highly glossy faces, i.e., the faces of the chamfers 221, 223 and 225 have the effect of reflective mirrors.

In this embodiment, the middle frame 20 is made of a metal material, and the chamfers 211, 213, 215, 221, 223 and 225 on the middle frame 20 are formed by polishing treatment.

An operational button 201 is further provided on the right side face 24 of the middle frame 20 for controlling the driving device 50, i.e., pressing the operational button 201 enables the driving device 50 to drive the mounting box 41 to extend out of or retract into the receiving groove 27. In this embodiment, there are electrical connection and signal connection between the operational button 201 and the main board 30.

The display screen module 60 comprises a display screen 62 and a positioning frame 64 covering the periphery of the display screen 62, and the receiving groove 27 is defined by the positioning frame 64, the connection plate 214 of the middle frame 20 and the back plate 80 together.

The mounting box 41 is used for mounting other electronic devices such as a camera, an earpiece, a flash light, a fingerprint recognition module or the like, the mounting box 41 is generally rectangular, and the mounting box 41 comprises a front side face 413 facing the display screen module 60, a back side face 414 facing the back plate 80, a left side face 415 and a right side face 416 disposed opposite to each other, a top face 417, and a bottom face. When the mounting box 41 is retracted into the receiving groove 27, the left side face 415 of the mounting box 41 is flush with the left side face 23 of the middle frame 20, and the right side face 416 of the mounting box 41 is flush with the right side face 24 of the middle frame 20. The first camera 410 is disposed on the front side face 413 of the mounting box 20, and the back side face 414 of the mounting box 41 is provided with a second camera 420 and a flash light 43 connected to the main board 30. The mounting box 41 is further provided with electronic devices such as an earpiece 46 and a photosensitive element 47 connected to the main board 30. The first camera 410, the second camera 420, the flash light 43, the earpiece 46 and the photosensitive element 47 are all disposed in a staggered manner on the mounting box 41 or part of these electronic devices are disposed in a staggered manner on the mounting box 41. That is, the aforesaid electronic devices are not overlapped within the mounting box 41 in the front-back direction, which helps to reduce the thickness of the mounting box 41, thereby reducing the overall thickness of the mobile terminal 100. The first camera 410, the second camera 420, the flash light 43, the earpiece 46 and the photosensitive element 47 are connected to the main board 30 by a data line 49 via one through hole 216 of the middle frame 20 so that electrical connection and signal connection are achieved between these electronic devices and the main board 30.

In this embodiment, a transitional arc exists between the left side face 415 and the top face 417 of the mounting box 41, and a transitional arc exists between the right side face 416 and the top face 417 of the mounting box 41. Left and right sides of the front side face 413 of the mounting box 41 are respectively disposed as arc-shaped faces 4133, each of the arc-shaped faces 4133 is bent towards the back side face 414 of the mounting box 41 from the front side face 413 of the mounting box 41 and extended to the left side face 415 or the right side face 416 of the mounting box 41. A front flange 4135 extends along an intersection line of the front side face 413 and the left side face 415, an intersection line of the front side face 413 and the top face 417, and an intersection line of the front side face 413 and the right side face 416 so that a segment of the front flange 4135 that is located between the edge of the left side face 415 and the edge of the top face 417 is bent towards the front side from the back side of the mounting box 41, and a segment of the front flange 4135 that is located between the edge of the right side face 416 and the edge of the top face 417 is bent towards the front side from the back side of the mounting box 41.

The front flange 4135 is provided at a side of the front side face 413 of the mounting box 41 that faces the display screen module 60 along an edge of the left side face, an edge of the top face and an edge of the right side face of the mounting box 41, i.e., the front flange 4135 extends along the periphery of the mounting box 41. The front flange 4135 overlies the positioning frame 64 when the mounting box 41 is retracted into the receiving groove 27.

In this embodiment, a positioning groove 642 is defined at the top of the positioning frame 64 that faces the receiving groove 27 and at a side edge of the top of the positioning frame, the positioning groove 642 is communicated with the receiving groove 27, and a part of the front flange 4135 is accommodated in the positioning groove 642 when the mounting box 41 is retracted into the receiving groove 27.

A sound hole 462 is provided between the front flange 4135 and the positioning frame 64. The sound of the earpiece 46 can be released from the sound hole 462 when the mounting box 42 is retracted into the receiving groove 27. The sound hole 462 is defined on the front flange 4135, and the sound hole 462 is adjacent to the earpiece 46 and communicated with the earpiece 46. In this embodiment, the sound hole 462 is defined on the front side face of the front flange 4135 that faces the display screen module 60, and the cross section of the sound hole 462 is triangular. The sound hole 462 comprises a top inner face 464, the top inner face 464 is an oblique face, i.e., the top inner face 464 is the plane where the long side of the triangular cross section of the sound hole 462 is located, and the top inner face 464 extends upward and forward from the front side face 413 of the mounting box 41. The sound of the earpiece 46 can be released along the top inner face 464 of the sound hole 462.

In this embodiment, the earpiece 46 is disposed on the top inner face 464 of the sound hole 462.

In other embodiments, the earpiece 46 can be disposed on the front side face 413 of the mounting box 41, and the earpiece 46 is located at the lower side of the front flange 4135.

In other embodiments, the sound hole may be defined on the positioning frame 64, and the sound hole is adjacent to the earpiece 46 and communicated with the earpiece 46.

The edge of the front flange 4135 that faces away from the peripheral face of the positioning frame 64 is provided as a chamfer 4137, the face of the chamfer 4137 of the front flange 4135 is provided as a highly glossy face, i.e., the face of the chamfer 4137 has the effect of a reflective mirror. The chamfer 4137 at the left side of the front flange 4135 is flush with the chamfer 211 between the front side face 21 and the left side face 23 of the middle frame 20, and the chamfer 4137 at the right side of the front flange 4135 is flush with the chamfer 213 between the front side face 21 and the right side face 24 of the middle frame 20. In this embodiment, the mounting box 41 is formed of a metal material, and the face of the chamfer of the front flange 4135 is formed by polishing treatment.

In this embodiment, the face of the chamfer 4137 is a flat face. In other embodiments, the face of the chamfer 4137 may be an arc-shaped face.

A transparent plate 418 is further disposed on the front side face 413 of the mounting box 41, and the transparent plate 418 covers the first camera 410 to prevent dust from entering into the lens of the first camera 410. A through hole 4182 corresponding to the earpiece 46 is defined on the transparent plate 418, and the sound of the earpiece 46 is released from the through hole 4182. In this embodiment, the transparent plate 418 is a glass plate.

In other embodiments, the transparent plate 418 may be a transparent plastic plate or a transparent PVC plate or the like.

A back flange 4145 is provided at a side of the back side face 414 of the mounting box 41 that faces the back plate 80 along an edge of the left side face, an edge of the top face and an edge of the right side face of the mounting box 41, i.e., the back flange 4145 extends along the periphery of the mounting box 41. The back flange 4145 overlies the back plate 80 when the mounting box 41 is retracted into the receiving groove 27. The edge of the back flange 4145 that faces away from the peripheral face of the back plate 80 is provided as a chamfer 4147, the face of the chamfer 4147 of the back flange 4145 is provided as a highly glossy face, i.e., the chamfer 4147 has the effect of a reflective mirror. The chamfer 4147 at the left side of the back flange 4145 is flush with the chamfer 221 between the back side face 22 and the left side face 23 of the middle frame 20, and the chamfer 4147 at the right side of the back flange 4145 is flush with the chamfer 223 between the back side face 22 and the right side face 24 of the middle frame 20. In this embodiment, the face of the chamfer 4147 of the back flange 4145 is formed by polishing treatment.

Left and right sides of the back side face 414 of the mounting box 41 are also respectively disposed as arc-shaped faces 4143, each of the arc-shaped faces 4143 is bent towards the front side face 413 of the mounting box 41 from the back side face 414 of the mounting box 41 and extended to the left side face 415 or the right side face 416 of the mounting box 41. The back flange 4145 extends along an intersection line of the back side face 414 and the left side face 415, an intersection line of the back side face 414 and the top face 417, and an intersection line of the back side face 414 and the right side face 416 so that a segment of the back flange 4145 that is located between the left side face 415 and the top face 417 is bent towards the back side from the front side of the mounting box 41, and a segment of the back flange 4145 that is located between the right side face 416 and the top face 417 is bent towards the back side from the front side of the mounting box 41.

In this embodiment, the face of the chamfer 4147 is a flat face. In other embodiments, the face of the chamfer 4147 may be an arc-shaped face.

A projecting part 4146 is disposed on the top of the back side face 414 of the mounting box 41 and adjacent to the back flange 4145, and an accommodating opening 82 is defined on the top of the back plate 80 corresponding to the projecting part 4146. Electronic devices such as the second camera 420 and the flash light 43 or the like are located at the lower side of the projecting part 4146, and the electronic devices such as the second camera 420 and the flash light 43 or the like are exposed out of the accommodating opening 82 when the mounting box 41 is extended out of the receiving groove 27.

In this embodiment, the projecting part 4146 is an arc-shaped projecting part, and the accommodating opening 82 is an arc-shaped notch corresponding to the arc-shaped projecting part. When the mounting box 41 is retracted into the receiving groove 27, the second camera 420 and the flash light 43 are hidden within the receiving groove 27, the projecting part 4146 abuts the accommodating opening 82, and an external face of the projecting part 4146 is flush with an external face of the back plate 80. When the mounting box 41 is extended out of the receiving groove 27, the projecting part 4146 and the top face of the accommodating opening 82 of the back plate 80 form an arc-shaped groove 86, and the electronic devices such as the second camera 420 and the flash light 43 are exposed out of the arc-shaped groove 86.

A transparent plate 419 is further disposed on the back side face 414 of the mounting box 41, and the transparent plate 419 covers the second camera 420 to prevent dust from entering into the lens of the second camera 420. A notch 4192 corresponding to the projecting part 4146 is defined on the top of the transparent plate 419. That is, when the mounting box 41 is retracted into the receiving groove 27, the projecting part 4146 is accommodated within the notch 4192. In this embodiment, the transparent plate 418 is a glass plate.

In other embodiments, the transparent plate 418 may be a transparent plastic plate or a transparent PVC plate or the like.

The top face 417 of the mounting box 41 protrudes outwardly along the extending and retracting direction of the mounting box 41. In this embodiment, the top face 417 of the mounting box 41 is an arc-shaped face so that the top face 417 of the mounting box 41 is less likely to adsorb dust.

The middle part of the top face 417 of the mounting box 41 is recessed to form a concave portion 4173, and a microphone hole 4175 is defined on an inner face of the concave portion 4173.

In other embodiments, the back plate 80 is a second display screen disposed on the back side face 22 of the middle frame 20, and the second display screen may be the whole or part of the back plate 80. The second display screen is connected to the main board 30, i.e., the mobile terminal 100 is a double-screen mobile phone. The top of the middle frame 20 forms the receiving groove 27 between the display screen module 60 and the second display screen, and the mounting box 41 is slideably received in the receiving groove 27 along the direction parallel to the display screen 62. There are electrical connection and signal connection between the second display screen and the main board 30.

In other embodiments, the middle frame may be formed integrally with the back plate, and a receiving groove penetrating through opposite left and right side faces of the middle frame is defined on the top face of the middle frame along the left-right direction.

The driving device 50 comprises two connectors 52 connected to the bottom face of the mounting box 41, two driving components 54 fixed within the middle frame 20 and connected to the main board 30, and a drive element 56 disposed on each of the driving components 54. The two connectors 52 are respectively disposed at left and right sides of the bottom face of the mounting box 41, and each of the connectors 52 comprises an extension bar extending outwardly from the bottom face of the mounting box 41, and a protrusion 522 disposed protruding at the end of the extension bar in the direction perpendicular to the extension direction of the extension bar. Each of drive elements 56 is a drive rod extending and penetrating through a corresponding through hole 216 along the extending and retracting direction of the mounting box 41, and a spiral groove 562 is defined on the peripheral wall of each drive rod along the extending and retracting direction of the mounting box 41. The protrusions 522 of the two connectors 52 are respectively slideably fitted on the spiral grooves 562 of the two drive rods. The two driving components 54 respectively drive the two drive elements 56 to rotate so as to drive the protrusion 522 of each connector 52 to slide along the corresponding spiral groove 562. Thus, each connector 52 extends into or retracts out of the corresponding through hole 216 to drive the mounting box 41 to extend out of or retract into the receiving groove 27. There are electrical connection and signal connection between the two driving components 54 and the main board 30.

Referring to FIG. 1 to FIG. 16 together, when the first camera 410 or the second camera 420 is required to capture a picture, the operational button 201 is pressed to send a triggering signal to a controller on the main board 30. The controller receives the triggering signal and controls the two driving components 54 to drive the rotation of the two drive elements 56 so that the protrusion 522 of each connector 52 slides along the corresponding spiral groove 562. In this way, each connector 52 is driven to slide along the extending and retracting direction of the mounting box 41 so that the mounting box 41 extends out of the receiving groove 27, and the two driving components 54 stop driving the rotation of the two drive elements 56 until the first camera 410 and the earpiece 46 are exposed out of the top face of the positioning frame 64, and the second camera 420 and the flash light 43 are exposed out of the arc-shaped groove 86, thereby making it convenient to use the electronic devices such as the first camera 410, the second camera 420 or the earpiece 46 or the like.

When the mounting box 41 needs to be received for storage, the operational button 201 is pressed to send a triggering signal to the controller on the main board 30. The controller receives the triggering signal and controls the two driving components 54 to drive the reverse rotation of the two drive elements 56 so that the protrusion 522 of each connector 52 slides along the corresponding spiral groove 562. In this way, each connector 52 is driven to slide into the corresponding through hole 216 along the extending and retracting direction of the mounting box 41 so that the mounting box 41 is retracted into the receiving groove 27, and the two driving components 54 stop driving the rotation of the two drive elements 56 until the first camera 410, the second camera 420 and the earpiece 46 are all hidden into the receiving groove 27. At this point, the mounting box 41 is positioned within the receiving groove 27, the left side face 415 of the mounting box 41 is flush with the left side face 23 of the middle frame 20, the right side face 416 of the mounting box 41 is flush with the right side face 24 of the middle frame 20, the projecting part 4146 is accommodated within the accommodating opening 82, the front flange 4135 overlies the positioning frame 64, and the back flange 4145 overlies the back plate 80.

The top face 26 of the middle frame 20, the display screen module 60 and the back plate 80 of the mobile terminal 100 of the present disclosure together form the receiving groove 27, the mounting box 41 is slideably received in the receiving groove 27, and the controller on the main board 30 can control the driving device 50 to drive the mounting box 41 to extend out of or retract into the receiving groove 27 so that electronic devices on the mounting box 41, such as the first camera 410, the second camera 420, the flash light 43, the earpiece 46 and the photosensitive element 47 or the like, are exposed out of or hidden into the receiving groove 27. These electronic devices will not occupy the area of the display screen module 60 and the second display screen of the mobile terminal 100 because they are all disposed on the mounting box 41, and thus the screen-to-body ratio of the mobile terminal 100 can be improved. Additionally, because the front flange 4135 overlies the positioning frame 64, and the back flange 4145 overlies the back plate 80, dust can be prevented from entering into the receiving groove 27 and thus can be prevented from entering into the mobile terminal 100.

In other embodiments, the driving device 50 comprises a connector 52 connected to the bottom face of the mounting box 41, a driving component 54 fixed within the middle frame 20 and connected to the main board 30, and a drive element 56 disposed on the driving component 54. The connector 52 is disposed on the bottom face of the mounting box 41, and the connector 52 comprises an extension bar extending outwardly from the bottom face of the mounting box 41, and a protrusion 522 disposed protruding at the end of the extension bar. The drive element 56 is a drive rod extending and penetrating through a corresponding through hole 216 along the extending and retracting direction of the mounting box 41, and a spiral groove 562 is defined on the peripheral wall of the drive rod along the extending and retracting direction of the mounting box 41. The protrusion 522 of the connector 52 is slideably fitted on the spiral grooves 562 of the drive rod.

In other embodiments, the operational button may be a touch icon disposed on the display screen module 60, a triggering signal will be sent to the controller on the main board 30 by clicking on the touch icon, and the controller receives the triggering signal and controls the two driving components 54 to drive the rotation of the two drive elements 56.

Figure 17:
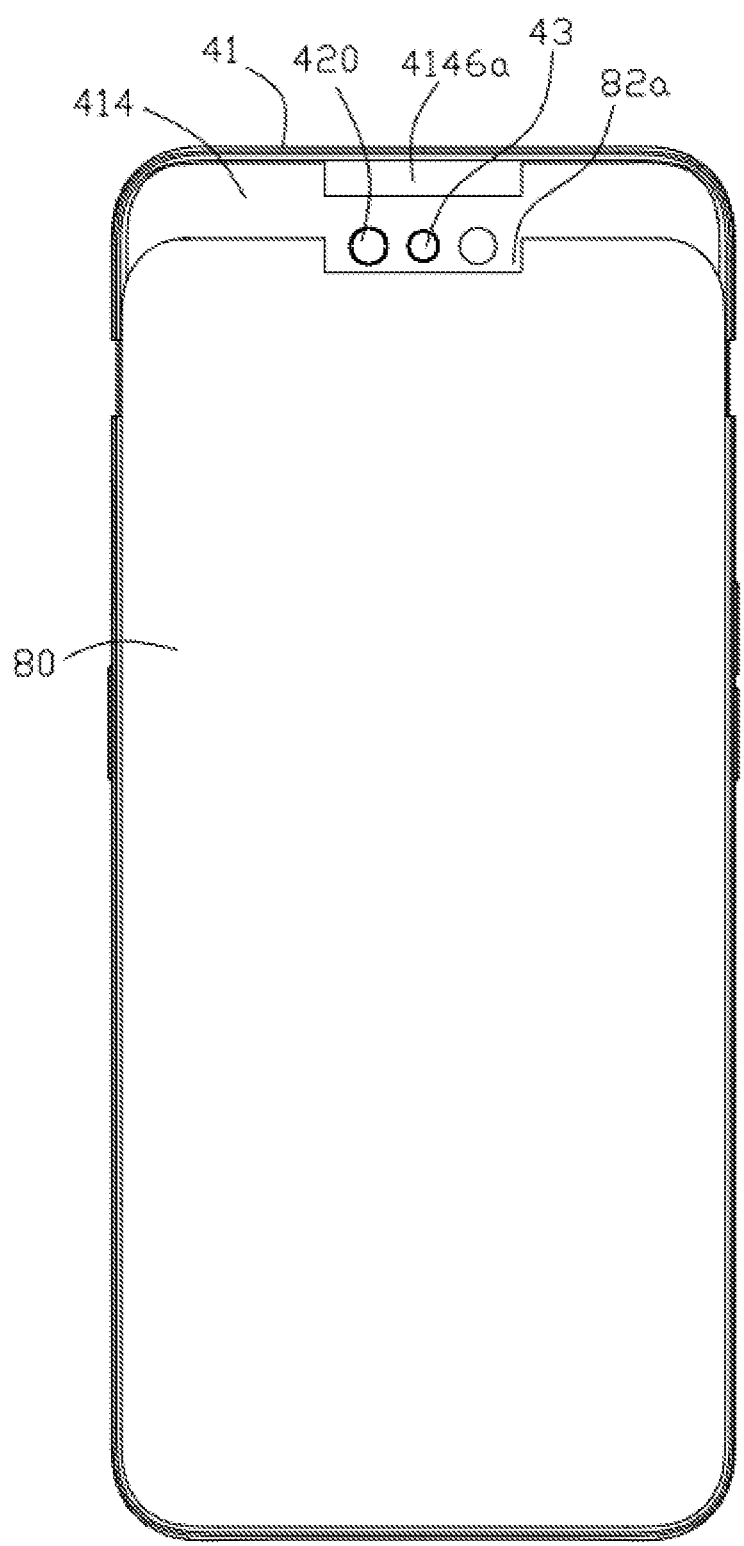
FIG. 17 is a schematic view of a side face of a mobile terminal according to a second embodiment of the present disclosure.

Referring to FIG. 17, FIG. 17 is a schematic view of a side face of a mobile terminal according to a second embodiment of the present disclosure. The structure of the second embodiment of the mobile terminal is similar to the structure of the first embodiment, and the difference therebetween lies in that: in the second embodiment, a projecting part 4146a on the top of the back side face 414 of the mounting box 41 is a rectangular projecting part, and a rectangular accommodating opening 82a is defined on the top of the back plate 80 corresponding to the projecting part 4146a. When the mounting box 41 is extended out of the receiving groove 27, electronic devices such as the second camera 420 and the flash light 43 or the like on the mounting box 41 are exposed out of the accommodating opening 82a. When the mounting box 41 is retracted into the receiving groove 27, the projecting part 4146a is accommodated within the accommodating opening 82a, and electronic devices such as the second camera 420 and the flash light 43 or the like on the mounting box 41 are hidden within the receiving groove 27.

In other embodiments, the projecting part on the top of the back side face 414 of the mounting box 41 may be a projecting part of a regular shape such as a round projecting part, a polygonal projecting part or the like, and an accommodating opening of a regular shape, such as a round shape, a polygonal shape or the like may be defined on the top of the back plate 80 corresponding to the projecting part.

Figure 18:
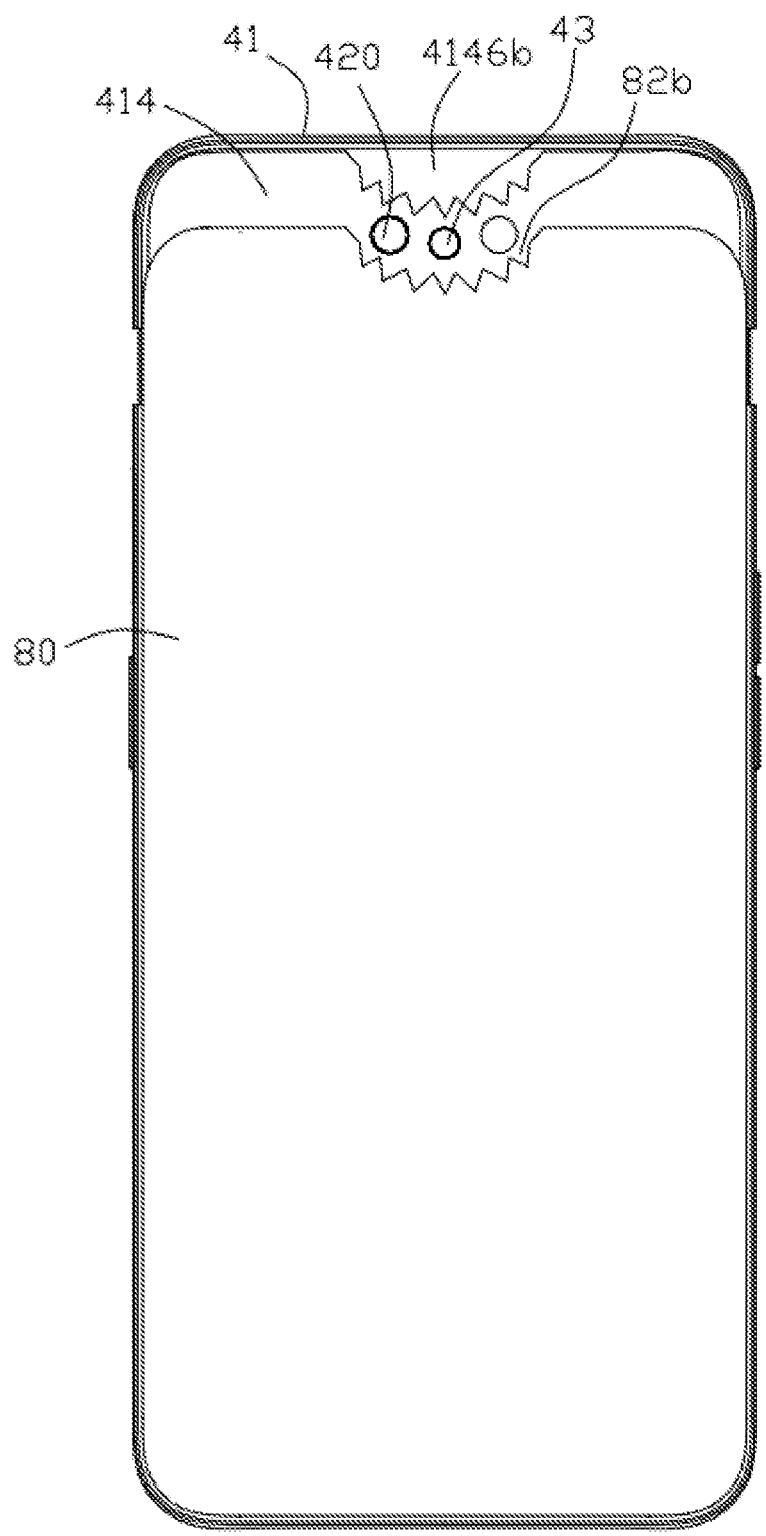
FIG. 18 is a schematic view of a side face of a mobile terminal according to a third embodiment of the present disclosure.

Referring to FIG. 18, FIG. 18 is a schematic view of a side face of a mobile terminal according to a third embodiment of the present disclosure. The structure of the third embodiment of the mobile terminal is similar to the structure of the first embodiment, and the difference therebetween lies in that: in the third embodiment, a projecting part 4146b on the top of the back side face 414 of the mounting box 41 is a projecting part of an irregular shape, and an accommodating opening 82b of an irregular shape is defined on the top of the back plate 80 corresponding to the projecting part 4146b. When the mounting box 41 is extended out of the receiving groove 27, the electronic devices such as the second camera 420 and the flash light 43 or the like on the mounting box 41 are exposed out of the accommodating opening 82b. When the mounting box 41 is retracted into the receiving groove 27, the projecting part 4146b is accommodated within the accommodating opening 82b, and the electronic devices such as the second camera 420 and the flash light 43 or the like on the mounting box 41 are hidden within the receiving groove 27.

Figure 19:
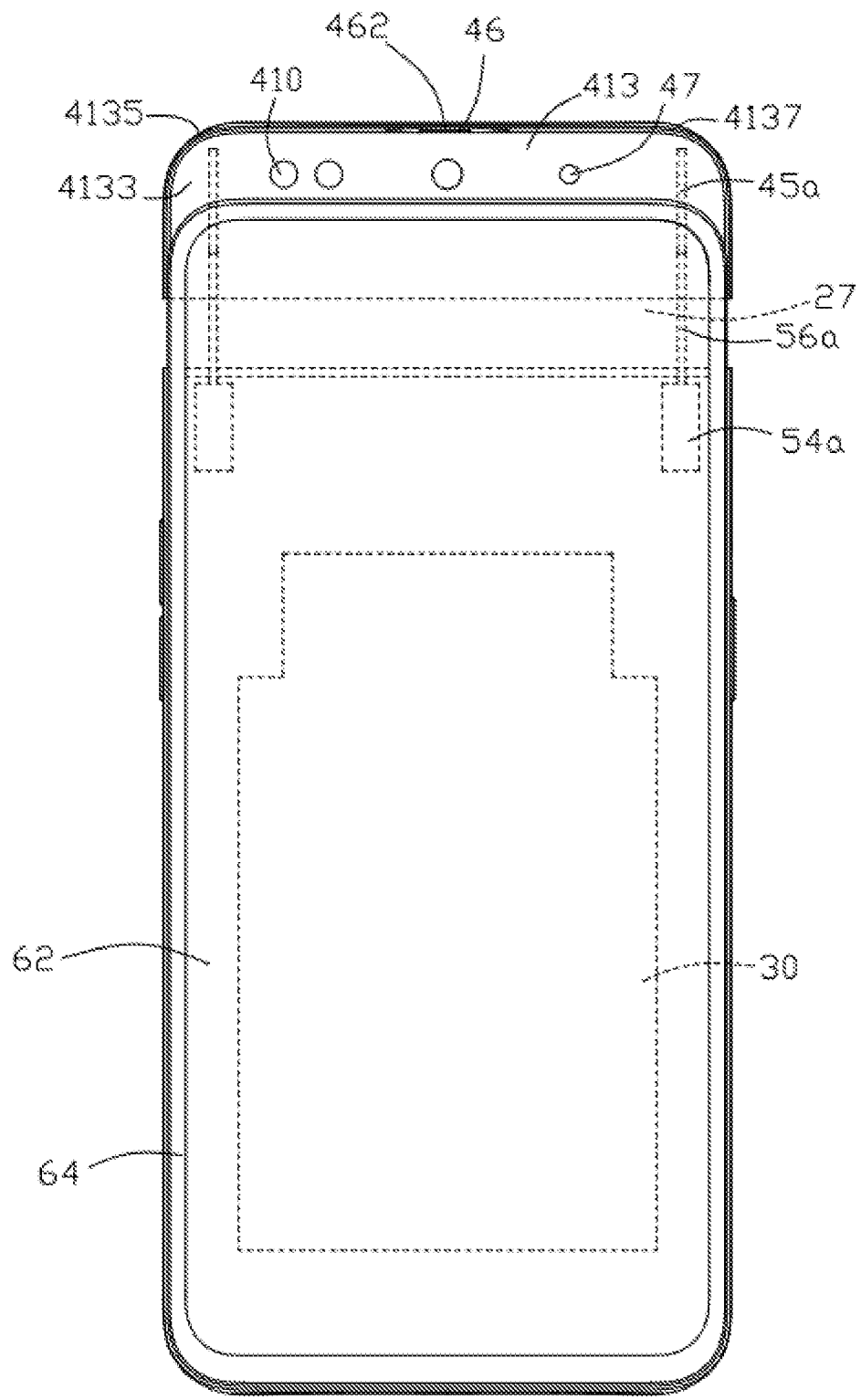
FIG. 19 is a schematic structural view of a mobile terminal according to a fourth embodiment of the present disclosure.

Referring to FIG. 19, FIG. 19 is a schematic structural view of a mobile terminal according to a fourth embodiment of the present disclosure. The structure of the fourth embodiment of the mobile terminal is similar to the structure of the first embodiment, and the difference therebetween lies in that: the driving device of the mobile terminal of the fourth embodiment is different from the driving device of the mobile terminal of the first embodiment, and the driving device in the fourth embodiment comprises two motors 54a fixed within the middle frame 20 and connected to the main board 30, and screw rods 56a respectively connected to each of the motors 54a. Each of the screw rods 56a extends in the extending and retracting direction of the mounting box 41. Two screw holes 52a jointed with the screw rods 56a respectively are defined on the bottom face of the mounting box 41, the main board 30 controls the two motors 54a to drive the two screw rods 56a to rotate so that the mounting box 41 is driven to extend out of or retract into the receiving groove. There are electrical connection and signal connection between the two motors 54a and the main board 30.

In other embodiments, the driving device comprises a motor 54a fixed within the middle frame 20 and connected to the main board 30, and a screw rod 56a connected to the motor 54a. The screw rod 56a extends in the extending and retracting direction of the mounting box 41. A screw hole 45a jointed with the screw rod 56a is defined on the mounting box 41, and main board 30 controls the motor 54a to drive the screw rod 56a to rotate so that the mounting box 41 is driven to extend out of or retract into the receiving groove 27.

Figure 20:
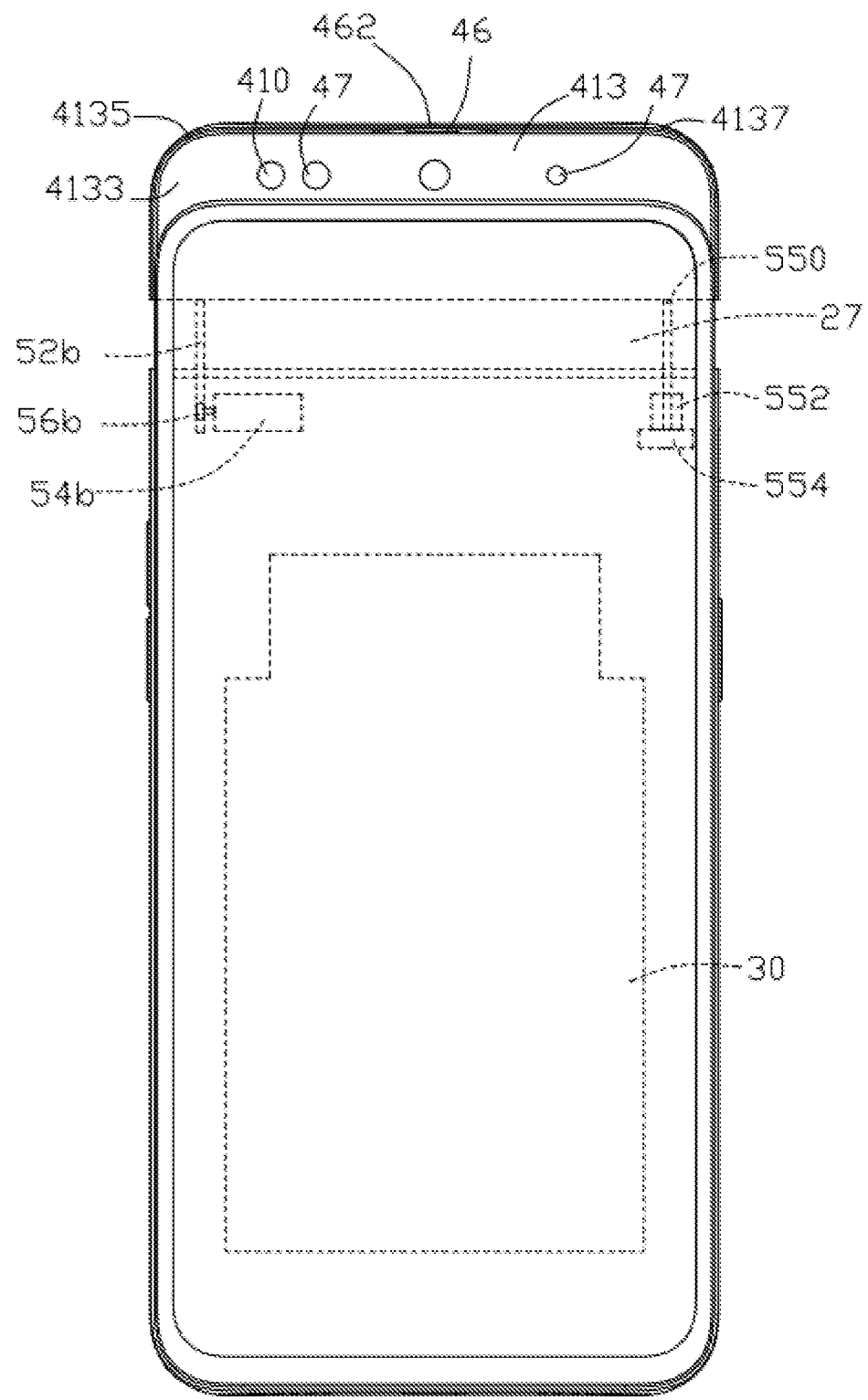
FIG. 20 is a schematic structural view of a mobile terminal according to a fifth embodiment of the present disclosure.

Referring to FIG. 20, FIG. 20 is a schematic structural view of a mobile terminal according to a fifth embodiment of the present disclosure. The structure of the fifth embodiment of the mobile terminal is similar to the structure of the first embodiment, and the difference therebetween lies in that: the driving device of the mobile terminal of the fifth embodiment is different from the driving device of the mobile terminal of the first embodiment, and the driving device in the fifth embodiment comprises a motor 54b fixed within the middle frame 20 and connected to the main board 30, a driving gear 56b connected on the motor 54b, and a rack 52b connected to the mounting box 41 and extending along the extending and retracting direction of the mounting box 41. The driving gear 56b is engaged with the rack 52b, and the motor 54b drives the driving gear 56b to rotate so that the rack 52b is driven to slide and make it convenient for the mounting box 41 to extend out of or retract into the receiving groove 27. There are electrical connection and signal connection between the motor 54b and main board 30.

In the fifth embodiment, a guiding mechanism is further disposed between the middle frame 20 and the mounting box 41. That is, the guiding mechanism comprises a guiding column 550 extending in the extending and retracting direction of the mounting box 41, a positioning block 552 disposed within the middle frame 20 and corresponding to the guiding column 550, and a stopper 554 disposed at an end of the guiding column 550 that is away from the mounting box 41. A guiding hole is defined on the positioning block 552 along the extending and retracting direction of the mounting box 41, and the guiding column 550 is slideably inserted into the guiding hole. During the process of extending the mounting box 41 out of or retracting the mounting box 41 into the receiving groove 27, the guiding column 550 slides along the guiding hole of the positioning block 552, and the stopper 554 can stop at an end of the positioning block 552 that is away from the mounting box 41 to prevent the mounting box 41 from being released from the middle frame 20.

Figure 21:
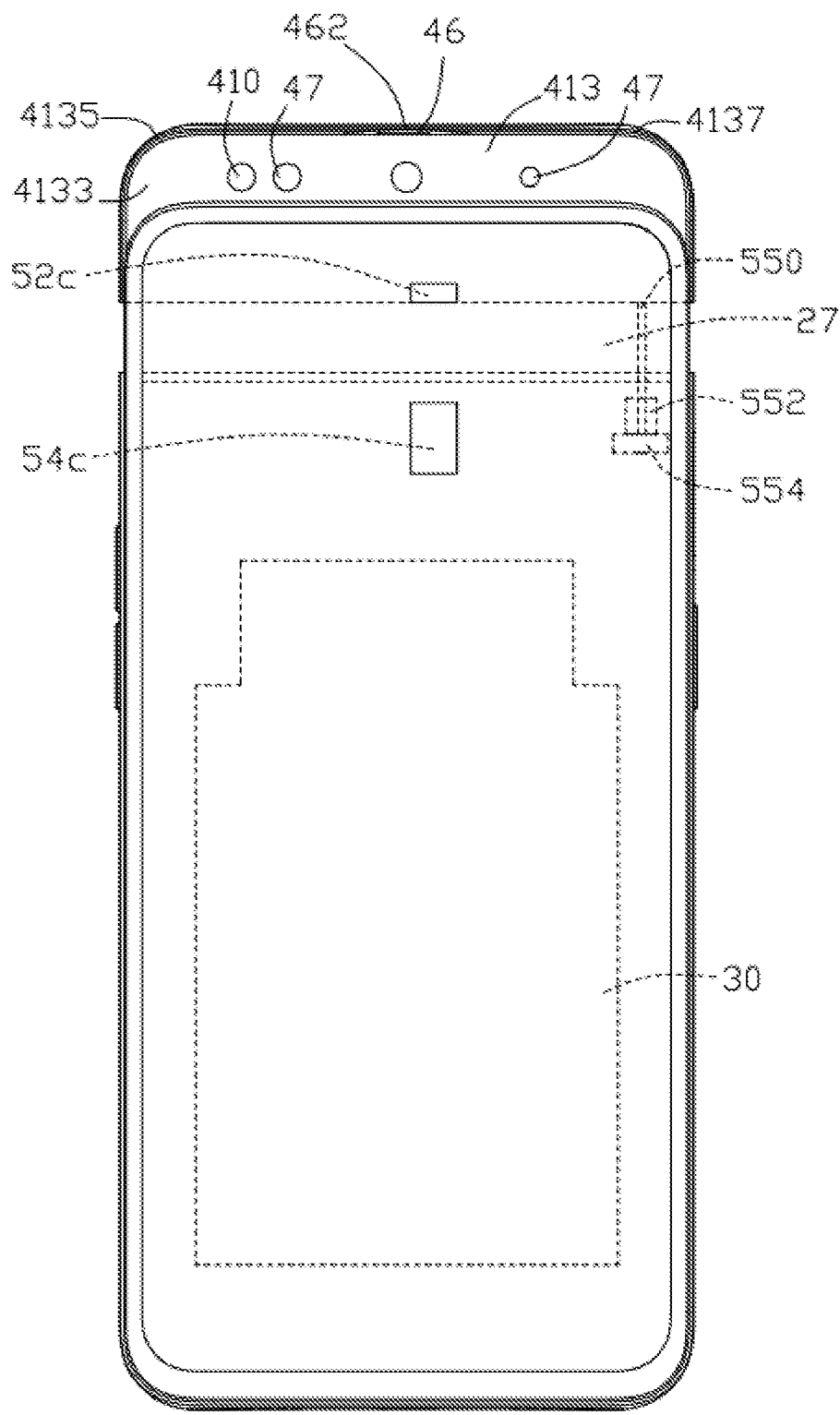
FIG. 21 is a schematic structural view of a mobile terminal according to a sixth embodiment of the present disclosure.

Referring to FIG. 21, FIG. 21 is a schematic structural view of a mobile terminal according to a sixth embodiment of the present disclosure. The structure of the sixth embodiment of the mobile terminal is similar to the structure of the fifth embodiment, and the difference therebetween lies in that: the driving device of the mobile terminal of the sixth embodiment is different from the driving device of the mobile terminal of the fifth embodiment, and the driving device in the sixth embodiment comprises an electromagnet 54c fixed within the middle frame 20 and electrically connected to the main board 30, and a magnet 52c disposed on the mounting box 41 and corresponding to the electromagnet 54c. When the mounting box 41 needs to be extended out of the receiving groove 27, the main board 30 supplies power to the electromagnet 54c so that the electromagnet 54c and the magnet 52c have same magnetic poles therebetween and are mutually repulsive, and the mounting box 41 can thus be driven to extend out of the receiving groove 27. When the mounting box 41 needs to be retracted into the receiving groove 27, the main board 30 supplies power to the electromagnet 54c and changes the power-supplying direction so that the electromagnet 54c and the magnet 52c haVe different magnetic poles therebetween and are mutually attractive, and the mounting box 41 can thus be driven to retract into the receiving groove 27. There are electrical connection and signal connection between the electromagnet 54c and the main board 30.

During the process of extending the mounting box 41 out of or retracting the mounting box 41 into the receiving groove 27, the guiding column 550 slides along the guiding hole of the positioning block 552, and the stopper 554 can stop at an end of the positioning block 552 that is away from the mounting box 41 to prevent the mounting box 41 from being released from the middle frame 20.

In other embodiments, the magnet 52c in the sixth embodiment may also be replaced by an electromagnet electrically connected to the main board 30, and the main board 30 supplies power to the two electromagnets and is capable of changing the power-supplying direction so that the magnetic poles between the two electromagnets are same or different to drive the mounting box 41 to extend out of or retract into the receiving groove 27.

In other embodiments, the driving device comprises a magnet fixed on the middle frame 20 and an electromagnet disposed on the mounting box 41 corresponding to the magnet. The electromagnet is electrically connected to the main board 30, the main board 30 supplies power to the electromagnet so that the magnet and the electromagnet have same magnetic poles therebetween and are mutually repulsive, and the mounting box 41 is thus driven to extend out of the receiving groove 27. When the mounting box 41 needs to be retracted into the receiving groove 27, the main board 30 stops supplying power to the electromagnet, and the iron core of the electromagnet on the mounting box 41 is adsorbed via the magnetic force of the magnet on the middle frame 20 so that the mounting box 41 is retracted into the receiving groove 27.

Figure 22:
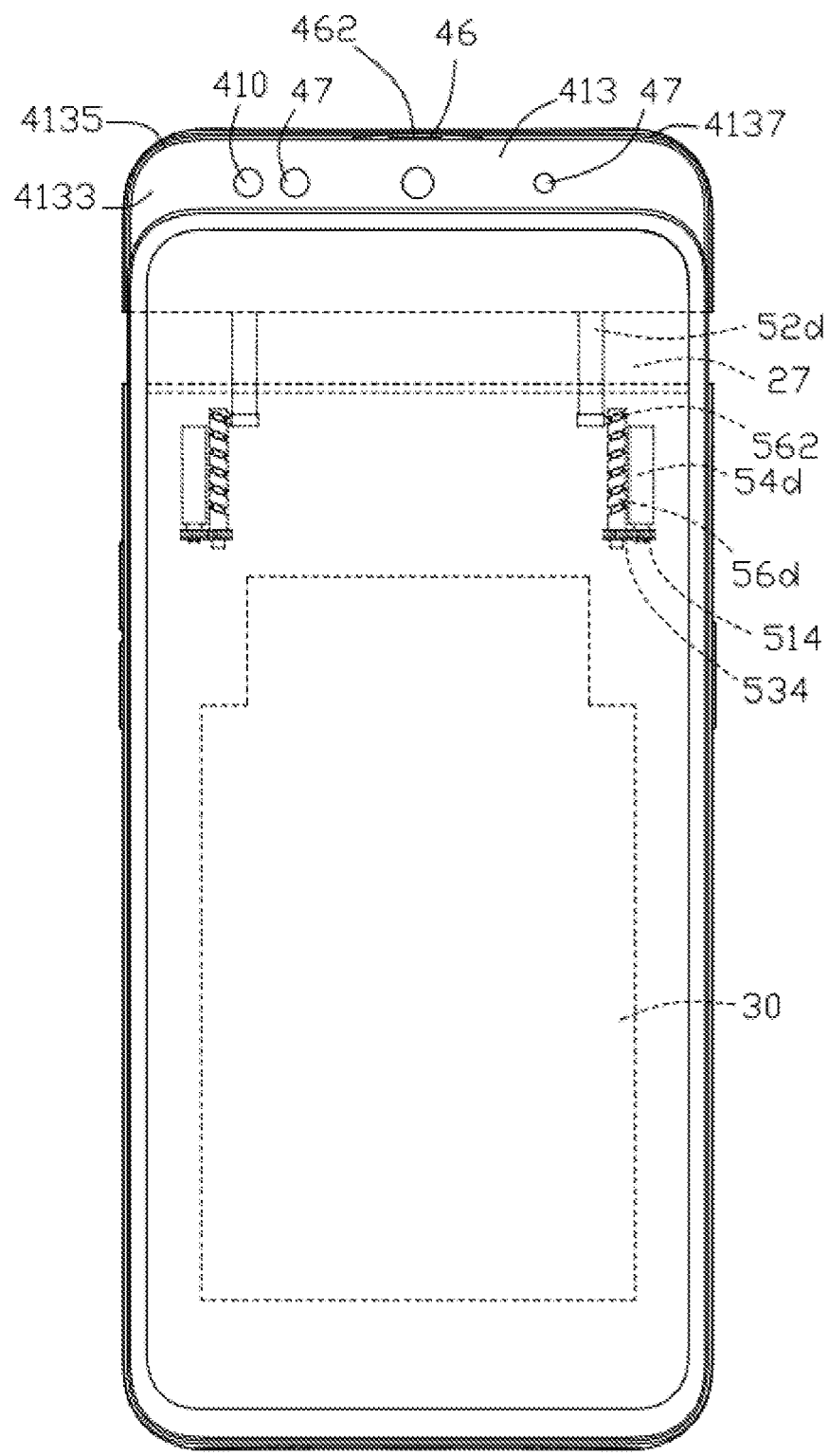
FIG. 22 is a schematic structural view of a mobile terminal according to a seventh embodiment of the present disclosure.

Referring to FIG. 22, FIG. 22 is a schematic structural view of a mobile terminal according to a seventh embodiment of the present disclosure. The structure of the seventh embodiment of the mobile terminal is similar to the structure of the first embodiment, and the difference therebetween lies in that: the driving device of the mobile terminal of the seventh embodiment is different from the driving device of the mobile terminal of the first embodiment, and the driving device of the mobile terminal of the seventh embodiment comprises two motors 54d fixed within the middle frame 20 and electrically connected to the main board 30, driving gears 514 connected on each of the motors 54d respectively, and drive rods 56d disposed respectively adjacent to each of the motors 54d and extending along the extending and retracting direction of the mounting box 41, and connection rods 52d disposed respectively adjacent to each of the drive rods 53c and sliding along the extending and retracting direction of the mounting box 41. A driven gear 534 engaged with the drive gear 514 on the corresponding motor 54d is disposed at an end of each of the drive rods 56d. A spiral groove 562 is defined on the peripheral wall of each of the drive rods 56d along the extending and retracting direction of the mounting box 41. A top end of each of the connection rods 52d is connected to the mounting box 41, and a slider that is slideably accommodated within the spiral groove 562 of the corresponding drive rod 56d is disposed at a bottom end of the connection rod 52d. The main board 30 controls the two motors 54d to drive the rotation of the two driving gears 514, which drives the corresponding driven gear 534 to rotate. Thus, each of the drive rods 56d rotates to drive the slider of the corresponding connection rod 52d to slide along the corresponding spiral groove 562, thereby driving the mounting box 41 to extend out of or retract into the receiving groove 27. There are electrical connection and signal connection between the two motors 54d and the main board 30.

Figure 23:
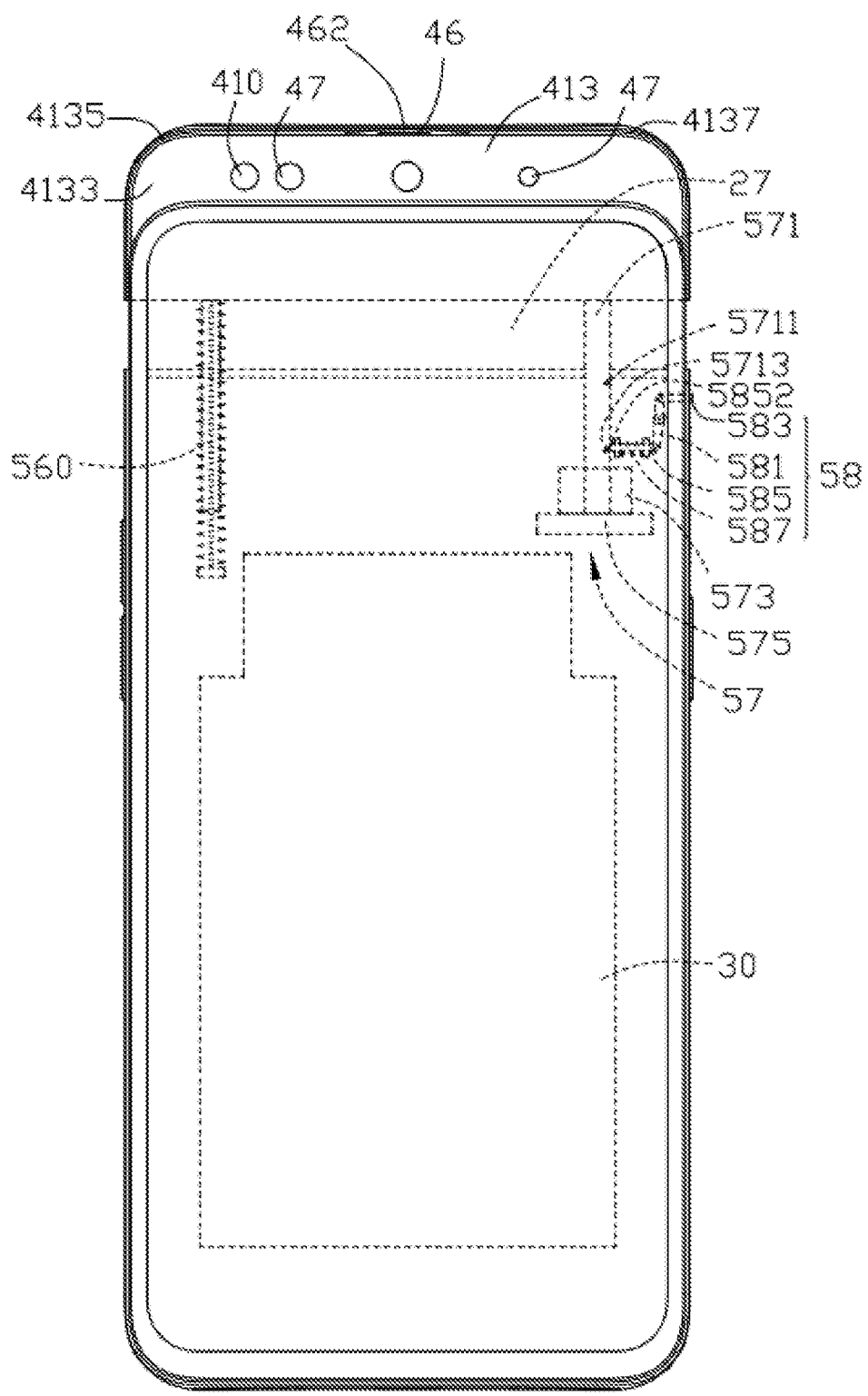
FIG. 23 is a schematic structural view of a mobile terminal according to an eighth embodiment of the present disclosure.

Referring to FIG. 23, FIG. 23 is a schematic structural view of a mobile terminal according to an eighth embodiment of the present disclosure. The structure of the eighth embodiment of the mobile terminal is similar to the structure of the first embodiment, and the difference therebetween lies in that: the driving device of the mobile terminal of the eighth embodiment is different from the driving device of the mobile terminal of the first embodiment, and the driving device in the eighth embodiment comprises an elastic component 560 that is elastically abutted against between the middle frame 20 and the mounting box 41, a guiding mechanism 57 disposed between the mounting box 41 and the middle frame 20, and a positioning mechanism 58 disposed on the middle frame 20. The elastic component 560 is configured to push the mounting box 41 out of the receiving groove 27. In this embodiment, the elastic component 560 is a spring connected between the mounting box 41 and the middle frame 20. The guiding mechanism 57 comprises a guiding bar 571 that is connected to the mounting box 41 and extending into the middle frame 20 along the extending and retracting direction of the mounting box 41, a positioning block 573 disposed within the middle frame 20 and corresponding to the guiding bar 571, and a stopper 575 disposed at an end of the guiding bar 571 that is away from the mounting box 41. A guiding hole is defined on the positioning block 573 along the extending and retracting direction of the mounting box 41, and the guiding bar 571 is slideably inserted into the guiding hole. The stopper 575 can stop at an end of the positioning block 573 that is away from the mounting box 41 to prevent the mounting box 41 from being released from the middle frame 20. A first positioning hole 5711 that is adjacent to the mounting box 41 and a second positioning hole 5713 that is away from the mounting box 41 are defined on the peripheral wall of the guiding bar 571. The positioning mechanism 58 comprises a rotary component 581 rotatably connected within the middle frame 20, a press component 583 rotatably connected at an end of the rotary component 581, a positioning slider 585 rotatably connected at another end of the rotary component 581 that is away from the press component 583, and an elastic component 587 connected on the positioning slider 585 and forcing the positioning slider 585 to reset. An end of the positioning slider 585 that is away from the rotary component 581 is slideably inserted into the first positioning hole 5711 or the second positioning hole 5713, and a guiding face 5852 is opened at an end of the positioning slider 585 that is adjacent to the guiding bar 571. An end of the press component 583 that is away from the rotary component 581 extends out of the middle frame 20 to form an operational button, the operation button of the press component 583 is pressed to drive the rotation of the rotary component 581, the rotary component 581 drives the positioning slider 585 to slide out of the first positioning hole 5711 or the second positioning hole 5713, and the elastic component 587 is elastically deformed to push the mounting box 41 to extend out of the receiving groove 27.

When the mounting box 41 is received within the receiving groove 27, the elastic component 560 is pressed between the mounting box 41 and the middle frame 20 and is thus elastically deformed, and an end of the positioning slider 585 that is away from the rotary component 581 is stuck into the first positioning hole 5711 to prevent the elastic component 560 from pushing the mounting box 41 out of the positioning groove 5711.

When the mounting box 41 needs to be extended out of the receiving groove 27, the operation button of the press component 583 is pressed to drive the rotation of the rotary component 581, the rotary component 581 drives the positioning slider 585 to slide in the direction away from the guiding bar 571 so that the positioning slider 585 is released from the first positioning hole 5711, and the elastic component 587 is elastically deformed. The elastic component 560 restores the deformation thereof to push the mounting box 41 out of the receiving groove 27, and the guiding bar 571 slides along the guiding hole of the positioning block 573 until the mounting box 41 is extended out of the receiving groove 27. At this point, the stopper 575 stops at the positioning block 573 to prevent the mounting box 41 from being released from the middle frame 20. When the positioning slider 585 right faces the second positioning hole 5713, the elastic component 587 restores the elastic deformation to push the positioning slider 585 into the second positioning hole 5713 to position the mounting box 41.

When the mounting box 41 needs to be retracted into the receiving groove 27, the mounting box 41 is pressed towards the receiving groove 27 so that the mounting box 41 slides into the receiving groove 27, and an upper face of the second positioning hole 5713 of the guiding bar 571 slideably pushes the guiding face 5852 of the guiding bar 571 so that the guiding bar 571 slides in the direction away from the second positioning hole 5713 to release the engagement with the guiding bar 571. The elastic component 560 and the elastic component 587 are all elastically deformed, and when the guiding bar 571 slides to the extent that the first positioning hole 5711 right faces the positioning slider 585, the elastic component 587 restores the elastic deformation to push the positioning slider 585 into the first positioning hole 5711 so that the mounting box 41 is located and stored within the receiving groove 27.

The mounting box 41 of the mobile terminal according to the eighth embodiment of the present disclosure is extended out of or retracted into the receiving groove 27 by means of the elastic component 560 abutted against between the middle frame 20 and the mounting box 41, the guiding mechanism 57 disposed between the mounting box 41 and the middle frame 20, and the positioning mechanism 58 disposed on the middle frame 20. In this way, the first camera 410 will not occupy the area of the display screen module 60 of the mobile terminal 100, thereby improving the screen-to-body ratio of the mobile terminal 100, saving energy and improving the operational sense of users.

The foregoing are embodiments of the present disclosure. It should be noted that a person of ordinary skill in the art can further make some improvement and modification without departing from the principles of the embodiments of the present disclosure. The improvement and modification may also be regarded as falling into the protection scope of the present disclosure.

What is claimed is:
1. A mobile terminal, comprising:
a middle frame;
a main board disposed in the middle frame;
a display screen module connected to the main board; and
a back plate;
the middle frame comprising a front side face, a back side face facing away from the front side face, a left side face and a right side face disposed opposite to each other, and a top face; the display screen module being disposed on the front side face of the middle frame, the back plate being disposed on the back side face of the middle frame;
wherein a receiving groove is defined on the top of the middle frame, the receiving groove is defined by the top face of the middle frame, the display screen module, and the back plate; the receiving groove extends in a left-right direction, and two opposite ends of the receiving groove extend to the left side face and the right side face of the middle frame respectively;
the mobile terminal further comprises a mounting box slideably received in the receiving groove, a first camera connected to the main board is disposed at a side face of the mounting box that faces the display screen module, the mounting box is configured to extend out of or retract into the receiving groove so that the first camera is exposed out of or hidden into the receiving groove.

2. The mobile terminal of claim 1, wherein the mounting box comprises a front side face facing the display screen module, a back side face facing the back plate, a left side face and a right side face disposed opposite to each other, and a top face; the left side face of the mounting box is flush with the left side face of the middle frame, the right side face of the mounting box is flush with the right side face of the middle frame, and the first camera is disposed on the front side face of the mounting box.

3. The mobile terminal of claim 2, wherein the display screen module comprises a display screen and a positioning frame covering the periphery of the display screen, a front flange is provided at a side of the front side face of the mounting box that faces the display screen module along an edge of the left side face, an edge of the top face and an edge of the right side face of the mounting box, and the front flange overlies the positioning frame when the mounting box is retracted into the receiving groove.

4. The mobile terminal of claim 3, wherein a segment of the front flange that is located between the left side face and the top face is bent towards the front side from the back side of the mounting box, and a segment of the front flange that is located between the right side face and the top face is bent towards the front side from the back side of the mounting box.

5. The mobile terminal of claim 3, wherein an earpiece connected to the main board is further provided on the front side face of the mounting box, a sound hole is provided between the front flange and the positioning frame, and sound of the earpiece can be released from the sound hole when the mounting box is retracted into the receiving groove.

6. The mobile terminal of claim 5, wherein the sound hole is communicated with the earpiece, and
the sound hole is defined on the front flange, or the sound hole is defined on the positioning frame and adjacent to the earpiece.

7. The mobile terminal of claim 6, wherein the sound hole is defined on a side face of the front flange that faces the display screen module, the sound hole comprises an oblique top inner face, the top inner face extends upward and forward from the front side face of the mounting box, and the earpiece is disposed on the top inner face of the sound hole.

8. The mobile terminal of claim 3, wherein the edge of the front flange that faces away from the peripheral face of the positioning frame is provided as a chamfer, a chamfer is provided at the intersection of the front side face and the left side face of the middle frame, a chamfer is provided at the intersection of the front side face and the right side face of the middle frame, the chamfer at a left side of the front flange is flush with the chamfer between the front side face and the left side face of the middle frame, and the chamfer at a right side of the front flange is flush with the chamfer between the front side face and the right side face of the middle frame.

9. The mobile terminal of claim 3, wherein a positioning groove is defined at the top of the positioning frame that faces the receiving groove and at a side edge of the top of the positioning frame, the positioning groove is communicated with the receiving groove, and a part of the front flange is received in the positioning groove when the mounting box is retracted into the receiving groove.

10. The mobile terminal of claim 2, wherein a transitional arc exists between the left side face and the top face of the mounting box, and a transitional arc exists between the right side face and the top face of the mounting box; or
wherein a transparent plate is disposed on the front side face of the mounting box, and the transparent plate covers the lens of the first camera.

11. The mobile terminal of claim 10, wherein left and right ends of the front side face of the mounting box are respectively disposed as arc-shaped faces, each of the arc-shaped faces is bent towards the back side face of the mounting box from the front side face of the mounting box and extended to the left side face or the right side face of the mounting box.

12. The mobile terminal of claim 2, wherein the top face of the mounting box is an arc-shaped face, the middle part of the top face of the mounting box is recessed to form a concave portion, and a microphone hole is defined on an inner face of the concave portion.

13. The mobile terminal of claim 2, wherein a back flange is provided at a side of the back side face of the mounting box that faces the back plate along an edge of the left side face, an edge of the top face and an edge of the right side face of the mounting box, and the back flange overlies the back plate when the mounting box is retracted into the receiving groove.

14. The mobile terminal of claim 13, wherein the edge of the back flange that faces away from the peripheral face of the back plate is provided as a chamfer, a chamfer is provided at the intersection of the back side face and the left side face of the middle frame, a chamfer is provided at the intersection of the back side face and the right side face of the middle frame, the chamfer at the left side of the back flange is flush with the chamfer between the back side face and the left side face of the middle frame, and the chamfer at the right side of the back flange is flush with the chamfer between the back side face and the right side face of the middle frame.

15. The mobile terminal of claim 2, wherein a projecting part is disposed on the top of the back side face of the mounting box, an accommodating opening is defined on the top of the back plate corresponding to the projecting part, and when the mounting box is retracted into the receiving groove, the projecting part abuts the accommodating opening, and an external face of the projecting part is flush with an external face of the back plate.

16. The mobile terminal of claim 15, wherein a second camera connected to the main board is disposed at the back side face of the mounting box, the second camera is located at the lower side of the projecting part, and the second camera is exposed out of the accommodating opening when the mounting box is extended out of the receiving groove.

17. The mobile terminal of claim 16, wherein the projecting part is an arc-shaped projecting part, the accommodating opening is an arc-shaped notch corresponding to the arc-shaped projecting part, and when the mounting box is extended out of the receiving groove, an arc-shaped groove is formed by the projecting part and a top face of the accommodating opening of the back plate, and the second camera is exposed out of the arc-shaped groove; or
wherein a transparent plate is disposed on the back side face of the mounting box, and the transparent plate covers the lens of the second camera.

18. The mobile terminal of claim 1, wherein the mobile terminal further comprises a driving device, and the driving device is configured to drive the mounting box to extend out of or retract into the receiving groove.

19. The mobile terminal of claim 18, wherein the driving device is one of following first to six driving devices:
wherein the first driving device comprises a connector connected to the mounting box, a driving component fixed in the middle frame and connected to the main board, and a drive rod disposed on the driving component; the drive rod extends along the extending and retracting direction of the mounting box, a spiral groove is defined on the drive rod; the connector comprises an extension bar extending along the extending and retracting direction of the mounting box, and a protrusion disposed protruding from the extending bar and slideably accommodated within the spiral groove; the driving component drives the drive rod to rotate and drives the protrusion to slide along the spiral groove so that the extension bar slides along the extending and retracting direction of the mounting box and the mounting box is driven to extend out of or retract into the receiving groove;
wherein the second driving device comprises a motor fixed within the middle frame and connected to the main board, and a screw rod connected to the motor; the screw rod extends in the extending and retracting direction of the mounting box, a screw hole jointed with the screw rod is defined on the mounting box, and the motor drives the screw rod to rotate so that the mounting box is driven to extend out of or retract into the receiving groove;
wherein the third driving device comprises a motor fixed within the middle frame and connected to the main board, a driving gear connected to the motor, and a rack disposed on the mounting box and extending along the extending and retracting direction of the mounting box; the gear is engaged with the rack, and the motor drives the gear to rotate so that the mounting box is driven to extend out of or retract into the receiving groove;
wherein the fourth driving device comprises an electromagnet fixed within the middle frame and connected to the main board, and a magnet disposed on the mounting box and corresponding to the electromagnet; when the main board supplies power to the electromagnet so that the electromagnet and the magnet have same magnetic poles therebetween and are mutually repulsive, the mounting box is driven to extend out of the receiving groove; and when the main board supplies power to the electromagnet and changes the power-supplying direction so that the electromagnet and the magnet have different magnetic poles therebetween and are mutually attractive, the mounting box is driven to retract into the receiving groove;

wherein the fifth driving device comprises a motor fixed within the middle frame and connected to the main board, a driving gear connected on the motor, a drive rod disposed adjacent to the motor and extending along the extending and retracting direction of the mounting box, and a connection rod disposed adjacent to the drive rod and sliding along the extending and retracting direction of the mounting box; a driven gear engaged with the drive gear is disposed at an end of the drive rod, a spiral groove is defined on the peripheral wall of the drive rod along the extending and retracting direction of the mounting box, a top end of the connection rod is connected to the mounting box, and a slider that is slideably accommodated within the spiral groove of the corresponding drive rod is disposed at a bottom end of the connection rod;

wherein the sixth driving device comprises an elastic component that is elastically abutted against between the middle frame and the mounting box, a guiding bar disposed on the mounting box along the extending and retracting direction of the mounting box, and a positioning mechanism; the positioning mechanism comprises a rotary component rotatably connected within the middle frame, a press component rotatably connected at an end of the rotary component, a positioning slider rotatably connected at another end of the rotary component that is away from the press component, and an elastic component connected on the positioning slider and forcing the positioning slider to reset; the positioning slider is configured to position the guiding bar, an end of the press component that is away from the rotary component extends out of the middle frame, an end of the press component that extends out of the middle frame is pressed to drive the rotary component to rotate so that the rotary component drives the positioning slider to release the positioning of the guiding bar, and the elastic component restores the deformation and pushes the mounting box to extend out of the receiving groove.

20. A mobile terminal, comprising:

a main board;

a display screen module connected to the main board;

a back plate;

a middle frame comprising a pair of spaced and parallel side walls engaged with the display screen module and the back plate to define a chamber, wherein the middle frame has a top connected with the side walls and lower than tops of the display screen module and the back plate such that a storage space is defined by the top of the middle frame and the display screen module and the back plate; the chamber and the storage space are divided by the top of the middle frame, and the main board is received in the chamber;

a slidable device received in the storage space and configured to move between a first position at which the slidable device extends out of the storage space and a second position at which the slidable device retracts into the storage space, wherein a camera is arranged on the slidable device and connected with the main board; when the slidable device is at the first position, the camera is exposed out of the storage space; when the slidable device is at the second position, the slidable device is covered by the display screen module and the camera is received in the storage space; and a driving mechanism connected to the main board, received in the chamber and configured to drive the slidable device with the camera to move between the first position and the second position.

* * * * *